US012227166B2

(12) United States Patent
Dougherty

(10) Patent No.: US 12,227,166 B2
(45) Date of Patent: Feb. 18, 2025

(54) HYBRID PROPULSION SYSTEM POWER MANAGEMENT

(71) Applicant: Rolls-Royce Corporation, Indianapolis, IN (US)

(72) Inventor: Michael P. Dougherty, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 466 days.

(21) Appl. No.: 17/230,410

(22) Filed: Apr. 14, 2021

(65) Prior Publication Data

US 2022/0017064 A1    Jan. 20, 2022

Related U.S. Application Data

(60) Provisional application No. 63/053,107, filed on Jul. 17, 2020.

(51) Int. Cl.
*B60W 20/13* (2016.01)
*B64D 27/02* (2006.01)
*B64D 27/24* (2024.01)

(52) U.S. Cl.
CPC ............. *B60W 20/13* (2016.01); *B64D 27/24* (2013.01); *B60W 2510/242* (2013.01); *B60W 2710/244* (2013.01); *B64D 27/026* (2024.01)

(58) Field of Classification Search
CPC ... B64D 27/24; B64D 2221/00; B60W 20/13; B60W 2510/242; B60W 2710/244;
(Continued)

(56) References Cited

U.S. PATENT DOCUMENTS 6,344,700 B1   2/2002  Eisenhauer et al.
9,194,285 B2  11/2015  Botti et al.
(Continued)

FOREIGN PATENT DOCUMENTS

CA        3038299 A1    4/2018
DE   102010021026 A1   11/2011
(Continued)

OTHER PUBLICATIONS

Knapp et al., "Zunum Aero's Hybrid Electric Airplane Aims to Rejuvenate Regional Travel," IEEE Spectrum, Apr. 26, 2018, 4 pp.
(Continued)

*Primary Examiner* — Jason H Duger
(74) *Attorney, Agent, or Firm* — Shumaker & Sieffert, P.A.

(57) ABSTRACT

An example method of managing power in a hybrid propulsion system includes receiving, by one or more processors, a power demand that specifies an amount of power to be used to propel a vehicle that includes an electrical energy storage system (ESS) and one or more electrical generators, wherein the one or more electrical generators are configured to convert mechanical energy to electrical energy; determining, based on the power demand and a predetermined ESS output limit, a first amount of power to be sourced from the ESS and a second amount of power to be sourced from the one or more generators; and causing, by the one or more processors, the ESS to output the first amount of power onto a direct current (DC) electrical distribution bus and the one or more generators to output the second amount of power onto the DC electrical distribution bus.

16 Claims, 15 Drawing Sheets

(58) Field of Classification Search
CPC ...... H02J 2310/44; H02J 1/106; H02J 7/1423; H02J 7/143; H02J 7/342
See application file for complete search history.

(56) References Cited

U.S. PATENT DOCUMENTS

| | | | |
|---|---|---|---|
| 9,327,600 | B1 | 5/2016 | Nehmeh |
| 9,751,614 | B1 | 9/2017 | Nguyen et al. |
| 10,443,504 | B2 | 10/2019 | Dalal |
| 10,759,540 | B2 | 9/2020 | Long |
| 11,159,024 | B2 | 10/2021 | Long |
| 11,225,881 | B2 | 1/2022 | Long |
| 2002/0059791 | A1* | 5/2002 | Willis ............... F01D 21/06 60/734 |
| 2008/0184906 | A1 | 8/2008 | Kejha |
| 2011/0210606 | A1 | 9/2011 | Selker |
| 2012/0209456 | A1 | 8/2012 | Harmon et al. |
| 2013/0094963 | A1 | 4/2013 | Rolt |
| 2013/0099065 | A1 | 4/2013 | Stuhlberger |
| 2014/0187107 | A1 | 7/2014 | Gemin et al. |
| 2015/0103457 | A1 | 4/2015 | Shander et al. |
| 2015/0144742 | A1 | 5/2015 | Moxon |
| 2015/0285165 | A1 | 10/2015 | Steinwandel et al. |
| 2016/0004374 | A1 | 1/2016 | Kneuper et al. |
| 2016/0023773 | A1 | 1/2016 | Himmelmann et al. |
| 2016/0236790 | A1 | 8/2016 | Knapp et al. |
| 2016/0257416 | A1 | 9/2016 | Himmelmann et al. |
| 2017/0072814 | A1 | 3/2017 | Kwon |
| 2017/0107910 | A1 | 4/2017 | Huang |
| 2017/0291712 | A1 | 10/2017 | Himmelmann et al. |
| 2017/0349293 | A1 | 12/2017 | Klemen et al. |
| 2018/0065742 | A1 | 3/2018 | Vondrell et al. |
| 2018/0079515 | A1 | 3/2018 | Harwood et al. |
| 2018/0163558 | A1 | 6/2018 | Vondrell et al. |
| 2018/0201384 | A1 | 7/2018 | Barth et al. |
| 2019/0023389 | A1 | 1/2019 | Murrow et al. |
| 2019/0181786 | A1 | 6/2019 | Singh et al. |
| 2019/0256200 | A1 | 8/2019 | Neff |
| 2019/0263519 | A1 | 8/2019 | Argus |
| 2019/0322379 | A1 | 10/2019 | Mackin |
| 2020/0062413 | A1* | 2/2020 | Feddersen ............ B64D 31/00 |
| 2020/0062414 | A1 | 2/2020 | Hon et al. |
| 2020/0140106 | A1* | 5/2020 | Dougherty ............ B64D 31/06 |
| 2020/0148372 | A1 | 5/2020 | Long |
| 2020/0148373 | A1 | 5/2020 | Long |
| 2020/0149427 | A1 | 5/2020 | Long |
| 2020/0153252 | A1 | 5/2020 | Long |
| 2020/0164755 | A1 | 5/2020 | Smolenaers |
| 2021/0140367 | A1* | 5/2021 | Tantot .................. B64D 27/14 |
| 2022/0166335 | A1* | 5/2022 | Vinson ..................... H02J 7/02 |
| 2022/0289393 | A1 | 9/2022 | Long |

FOREIGN PATENT DOCUMENTS

| | | |
|---|---|---|
| EP | 3375713 A1 | 9/2018 |
| EP | 3388652 A1 | 10/2018 |
| EP | 3392148 A1 | 10/2018 |
| GB | 2574039 A | 11/2019 |
| WO | 0074964 A1 | 12/2000 |
| WO | 2017009037 A1 | 1/2017 |

OTHER PUBLICATIONS

Bradley et al. "Subsonic Ultra Green Aircraft Research: Phase I Final Report," NASA/CR-2011-216847, Apr. 2011, 207 pp.

Bradley et al. "Subsonic Ultra Green Aircraft Research: Phase II—vol. II—Hybrid Electric Design Exploration," NASA/CR-2015-218704, Apr. 2015, 233 pp.

Lents, "Parallel Hybrid Gas Electric Propulsion Design Space," United Technologies Research Center, Aug. 22, 2017, 13 pp.

Robinson, "How E-Fan X Will Jump-Start a New Era in Hybrid-Electric Flight," Royal Aeronautical Society, Dec. 1, 2017, 16 pp.

Perkon, "Hypstair #2 Newsletter," Hypstair, Oct. 30, 2015, 12 pp.

* cited by examiner

Example of several PSR % on same plot

HYBRID PROPULSION SYSTEM POWER MANAGEMENT

This application claims the benefit of U.S. Provisional Patent Application No. 63/053,107 filed on Jul. 17, 2020, the entire contents of each of which are incorporated by reference herein.

TECHNICAL FIELD

This disclosure relates to hybrid propulsion systems.

BACKGROUND

A gas turbine engine is a type of internal combustion engine that may be used to power an aircraft, another moving vehicle, or an electric generator. The turbine in a gas turbine engine may be coupled to a rotating compressor that increases a pressure of fluid flowing into the turbine. A combustor may add fuel to the compressed fluid and combust the fuel/fluid combination. The combusted fluid may enter the turbine, where it expands, causing a shaft to rotate. The rotating shaft may drive the compressor, a propulsor, other devices, and loads including an electric generator. The propulsor may use the energy from the rotating shaft to provide propulsion for the system.

SUMMARY

In general, this disclosure describes power management of hybrid propulsion systems that enable vehicles to be propelled using combinations of electrical motors and combustion motors (e.g., thermodynamic engines such as gas turbine engines). As one example, one or more the combustion motors may provide mechanical energy to operate one or more electrical generators, and the electrical motors may utilize electrical power generated by the electrical generators to operate one or more propulsors. In some examples, a hybrid propulsion system includes one or more generators and one or more electrical storage systems (ESS), such as a battery, configured to output electrical energy onto one or more electrical busses. One or more electric machines may be configured to drive a respective propulsor of one or more propulsors using electrical energy received from at least one of the one or more electrical busses. In some examples, the one or more ESS are configured to additionally receive electrical energy from the one or more electrical busses, for example, to charge the one or more ESS. In some examples, a controller may be configured to receive an ESS output limit, such as a power share request, and determine how much electrical power to be used to propel a vehicle is sourced via the one or more ESS and the one or more generators based on the ESS output limit and the power required.

In some examples, the disclosure describes a method of managing power in a hybrid propulsion system, the method comprising: receiving, by one or more processors, a power demand that specifies an amount of power to be used to propel a vehicle that includes an electrical energy storage system (ESS) and one or more electrical generators, wherein the one or more electrical generators are configured to convert mechanical energy to electrical energy; determining, based on the power demand and a predetermined ESS output limit, a first amount of power to be sourced from the ESS and a second amount of power to be sourced from the one or more generators; and causing, by the one or more processors, the ESS to output the first amount of power onto a direct current (DC) electrical distribution bus and the one or more generators to output the second amount of power onto the DC electrical distribution bus.

In some examples, the disclosure describes a system comprising: an electrical energy storage system (ESS) configured to output electrical power onto a direct current (DC) electrical distribution bus; one or more electrical generators configured to output electrical power onto the DC electrical distribution bus, wherein the one or more electrical generators are configured to convert mechanical energy into electrical energy; one or more electrical propulsion units configured to propel a vehicle using electrical power received via the DC electrical distribution bus; and one or more processors configured to: receive a power demand that specifies an amount of power to be used to propel the vehicle; determine, based on the power demand and a predetermined ESS output limit, a first amount of power to be sourced from the ESS and a second amount of power to be sourced from the one or more generators; and cause the ESS to output the first amount of power onto the DC electrical distribution bus and cause the one or more electrical generators to output the second amount of power onto the DC electrical distribution bus.

The details of one or more examples are set forth in the accompanying drawings and the description below. Other features, objects, and advantages will be apparent from the description and drawings, and from the claims.

DETAILED DESCRIPTION

Vehicles may include combustion motors that convert chemical potential energy (e.g., fuel) to propulsion and/or to electrical power. In addition to combustion motors, vehicles may include electric machines to create propulsion. A vehicle that includes both combustion motors and electric machines may be referred to as a hybrid vehicle. The motors in hybrid vehicles may be configured as series, parallel, or series-parallel.

Combustion motor(s) may not directly provide power to propulsors, but instead may provide power in the form of rotational mechanical energy to one or more electric generators. The generator(s) may provide electrical power to the electric machine(s), which in turn provide power (i.e., rotational mechanical energy) to one or more propulsors. In some examples, a vehicle may include an ESS capable of storing electrical energy for subsequent use by the electric machines. The ESS may be charged with electrical energy generated by the generator(s) using mechanical energy from the combustion motor(s), electrical energy received from a source external to the vehicle (e.g., ground power in the case of an aircraft), and/or electrical energy generated by one or more other components of the vehicle. Some other components of the vehicle that may generate electrical energy include, but are not limited to, the electric machines (e.g., in a descent phase of flight in the case of an aircraft), solar panels, and the like.

The presence of multiple sources of electrical power allows for control over the use of the multiple sources to meet a request for power, e.g., a power demand, such as an amount of power to be used to propel a vehicle. In some examples, a power sharing scheme between one or more generators and one or more ESS may be used to provide power to one or more electric machines to propel a vehicle.

Figure 1:
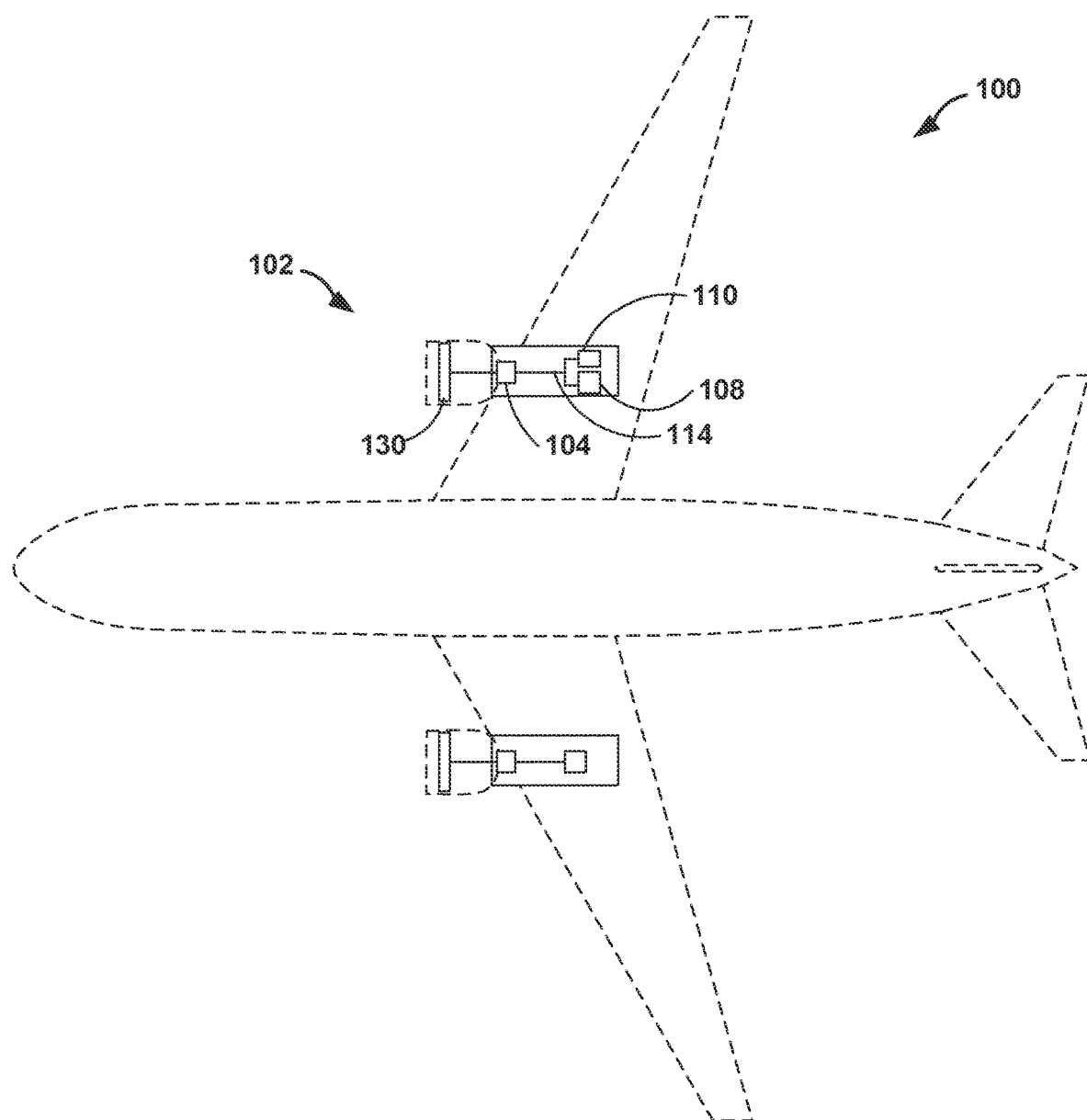
FIG. 1 is a conceptual diagram of a vehicle that includes an electric machine, in accordance with one or more techniques of this disclosure.

FIG. 1 is a conceptual diagram of a hybrid vehicle 100 that includes a power-sharing controller, in accordance with one or more techniques of this disclosure. In some examples, vehicle 100 includes an aircraft. In other examples, vehicle 100 may include any type of vehicle utilizing an electric machine, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. Vehicle 100 may be manned, semiautonomous, or autonomous.

As shown in the example of FIG. 1, vehicle 100 may include propulsion system 102. In some examples, propulsion system 102 may include a combustion engine, such as a gas-turbine engine. Propulsion system 102 includes motor 104 that is configured to drive propulsor 130. Propulsion systems that include gas-turbine engines may include electric generator 108 that may both start the gas-turbine engines and generate electrical power using mechanical energy generated by the gas-turbine engines. As shown in FIG. 1, propulsion system 102 may include generator 108 and ESS 110 coupled to electrical bus 114, and motor 104 coupled to electrical bus 114.

In accordance with one or more techniques of this disclosure, vehicle 100 may include components configured to control electrical power sourcing of generator 108 and ESS 110. For instance, a controller may determine a first amount of power of an amount of power to be used to propel vehicle 100 to be sourced from ESS 110, and a second amount of power of the amount of power to be used to propel vehicle 100 to be sourced from generator 108. One or more processors of vehicle 100, e.g., included in the controller, may determine the first and second amounts of power sourced via ESS 110 and generator 108, respectively, based on a predetermined ESS output limit.

Figure 2:
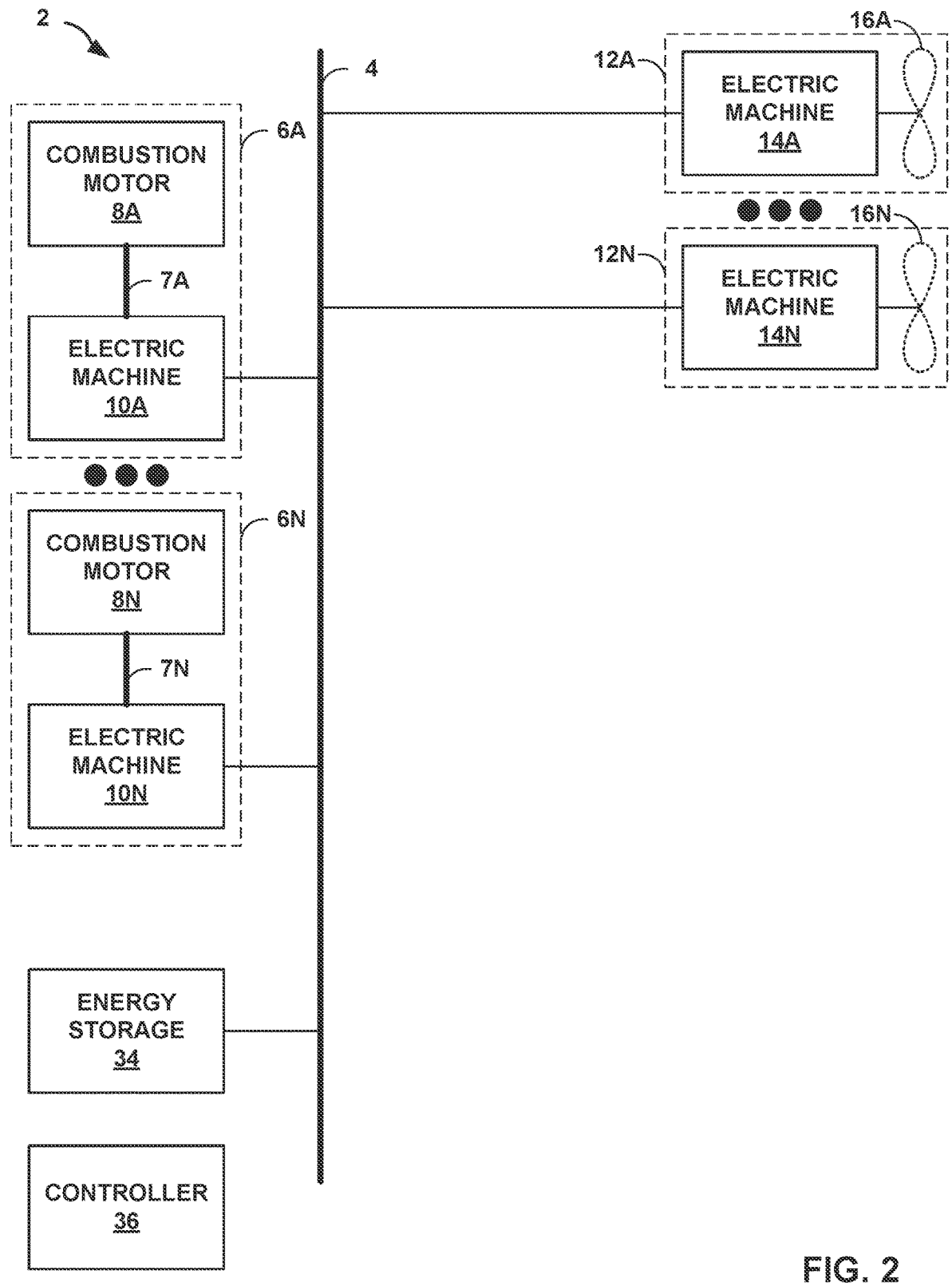
FIG. 2 is a conceptual block diagram illustrating a system that includes a hybrid propulsion system, in accordance with one or more techniques of this disclosure.

FIG. 2 is a conceptual block diagram illustrating a system 2 that includes a hybrid propulsion system, in accordance with one or more techniques of this disclosure. As shown in FIG. 2, system 2 includes an electrical bus 4, one or more power units 6A-6N (collectively, "power units 6"), one or more propulsion modules 12A-12N (collectively, "propulsion modules 12"), an ESS 34, and a controller 36. System 2 may be included in, and provide propulsion to, any vehicle, such as an aircraft, a locomotive, or a watercraft. System 2 may include additional components not shown in FIG. 2 or may not include some components shown in FIG. 2.

Electrical bus 4 provides electrical power interconnection between various components of system 2. Electrical bus 4 may include any combination of one or more direct current (DC) bus, one or more alternating current (AC) electrical bus, or combinations thereof. As one example, electrical bus 4 may include a DC bus configured to transport electrical power between power units 6 and propulsion modules 12. As another example, electrical bus 4 may include a plurality of redundant DC buses configured to transport electrical power between power units 6 and propulsion modules 12.

Power units 6 provide electrical power for use by various components of system 2. As shown in FIG. 2, each of power units 6 includes one or more combustion motors and one or more associated electric machines. For instance, power unit 6A includes combustion motor 8A and electric machine 10A, and power unit 6N includes combustion motor 8N and electric machine 10N. In operation, combustion motor 8A utilizes fuel to produce rotational mechanical energy, which may be provided to electric machine 10A via drive shaft 7A. Electric machine 10A converts the rotational mechanical energy into electrical energy and outputs the electrical energy to electrical bus 4. Each of the combustion motors included in power units 6 may be any type of combustion motor. Examples of combustion motors include, but are not limited to, reciprocating, rotary, and gas-turbines. In some examples, one or more of power units 6 may be a turbo-generator.

Each of power units 6 may have the same or different power generation capacities. As one example, when operating at peak power, power unit 6A may be capable of generating a greater amount of electrical power than power unit 6N. In this way, one or more of power units 6A-6N may be enabled, e.g., depending on a power demands of propulsion modules 12, other components of system 2, or both. As another example, when operating at peak power, power unit 6A and power unit 6N may be capable of generating the same amount of electrical power.

Power units 6 may have an output power limit that is less than their respective peak powers or full output power capacity. For example, a power unit output limit may be predetermined and based on power unit type, combustion motor type, electric machine type, and/or other components which may degrade, fail, or otherwise adversely affect the power unit if the power unit was allowed to operate at peak power for extended periods of time or without constraint. In other examples, a power unit output limit may be determined based on hours of operation of the power unit, determined condition of the power unit and/or its constituent components, and/or environmental conditions. For example, one or more components of system 2, e.g., controller 36, may determine the output power limits corresponding to each of power units 6. Power units 6 may have output power margin between their respective peak powers and output power limits and may override their respective output power limits and operate at up to their peak powers, for example, for propulsion power demands.

Propulsion modules 12 convert electrical energy to propulsion. As shown in FIG. 2, each of propulsion modules 12 may include one or more electric machines and one or more propulsors. For instance, propulsion module 12A includes electric machine 14A and propulsor 16A, and propulsion module 12N includes electric machine 14N and propulsor 16N. In operation, propulsion modules 12 may operate in a plurality of modes including, but not limited to, an motoring mode, a regeneration mode, and a neutral mode.

When propulsion module 12A operates in the motoring mode, electric machine 14A may consume electrical energy received via electrical bus 4 and convert the electrical energy to rotational mechanical energy to power propulsor 16A. When propulsion module 12A operates in the regeneration mode, electric machine 14A converts rotational mechanical energy received from propulsor 16A into electrical energy and provides the electrical energy to electrical bus 4. Electrical bus 4 may distribute the electrical energy to another one of propulsion modules 12, ESS 34, or combinations thereof. When propulsion module 12A operates in the neutral mode, propulsor 16A may reduce its fluid resistance (e.g., feather and/or blend with contours of an airframe).

Each of propulsion modules 12 may have the same or different propulsion capacities. As one example, when operating at peak power, propulsion module 12A may be capable of generating more propulsive power than propulsion module 12N. As another example, when operating at peak power, propulsion module 12A may be capable of generating the same amount of propulsive power as propulsion module 12N. As another example, propulsion module 12A may positioned at an outboard portion of a wing to provide greater yaw control while propulsion module 12N may be positioned at an inboard portion of the wing in order to provide primary propulsion.

For modules that include electric machines and combustion motors (i.e., power units 6), the electric machines may be discrete components included in their own housing, or may be integral to (i.e., included/embedded in) a same housing as the combustion motors. As one example, electric machine 10A may be included in same housing and/or directly mounted to combustion motor 8A. As another example, electric machine 10A may be attached to combustion motor 8A via a drive shaft.

Additionally, for modules that include electric machines and combustion motors, the modules may include an additional starter, be started by their respective electric machine(s) or be started through some other means. As one example, combustion motor 8A may include a starter that is different than electric machine 10A. As another example, electric machine 10A may operate as a starter for combustion motor 8A.

ESS 34 may provide energy storage capacity for system 2. ESS 34 may include any devices or systems capable of storing energy (e.g., electrical energy). Examples of devices that may be included ESS 34 include, but are not limited to, batteries, capacitors, supercapacitors, flywheels, pneumatic storage, and any other device capable of storing electrical energy or energy that may be converted to electrical energy (without combustion). ESS 34 may be coupled to electrical bus 4 and may be capable of providing electrical energy to electrical bus 4 and receiving electrical energy (e.g., for charging) from electrical bus 4.

In some examples, ESS 34 may include multiple energy storage systems. For instance, ESS 34 may include a first energy storage system configured to store and provide electrical energy for propulsion and a second energy storage system configured to store and provide electrical energy for other systems, such as avionics and/or hotel loads. In some examples, ESS 34 may include a single energy storage system. For instance, ESS 34 may include a single energy storage system configured to store and provide electrical energy for propulsion and other systems.

In some examples, one or more components of ESS 34 may be swappable. For example, one or more batteries of ESS 34 may be swappable while an aircraft including system 2 is on the ground. As such, the aircraft may be quickly able to return to a fully charged state without the need to charge the batteries on the ground.

Controller 36 may control the operation of one or more components of system 2. For instance, controller 36 may control the operation of electrical bus 4, power units 6, propulsion modules 12, and ESS 34. In some examples, controller 36 may include a single controller that controls all of the components. In other examples, controller 36 may include multiple controllers that each control one or more components. Where controller 36 includes multiple controllers, the controllers may be arranged in any configuration. As one example, controller 36 may include a separate controller for each module type. For instance, controller 36 may include a first controller that controls power units 6 and a second controller that controls propulsion modules 12. As another example, controller 36 may include a separate controller for each module, or sub-module, within the module types. For instance, controller 36 may include a separate controller for each of power units 6 and a separate controller for each of propulsion modules 12.

In some examples, controller 36 may determine the sourcing of electrical power to meet a power demand, for example, a request for power for an amount of power to be used to propel a vehicle. In some examples, controller 36 may receive a power demand, via one or more processor, specifying an amount of power to be used to propel a vehicle. Controller 36 may determine a first amount of power to be sourced from ESS 34 and second amount of power to be sourced from one or more generators, e.g., power units 6A, 6N. Controller 36 may determine the first and second amounts of power based on a predetermined ESS output limit, as illustrated and described below with respect to FIGS. 3-12.

Controller 36 may comprise any suitable arrangement of hardware, software, firmware, or any combination thereof, to perform the techniques attributed to controller 36 herein. Examples of controller 36 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 36 includes software or firmware, controller 36 further includes any necessary hardware for storing and executing the software or firmware, such as one or more processors or processing units. In some examples, controller 36 may be a full authority digital engine controller (FADEC).

In general, a processing unit may include one or more microprocessors, DSPs, ASICs, FPGAs, or any other equivalent integrated or discrete logic circuitry, as well as any combinations of such components. Although not shown in FIG. 2, controller 36 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 36 (e.g., may be external to a package in which controller 36 is housed).

In some examples, ESS 34 and/or power units 6 may include individual controllers (not shown), e.g., such that at least some of the functions of ESS 34 and/or power units 6 are controlled by their respective individual controller alone or in combination with controller 36. For example, ESS 34 may include a local controller to control charge current, discharge current, protection functions such as overcurrent disconnect and the like, controlling charge and discharge limits, etc. Power units 6 may include a local controller to control voltage, torque, speed, gate switching, protection functions, limits, regulating current, and the like.

In operation, system 2 may include and be propelled by any combination of propulsion modules 12, one or more power units 6, and ESS 34.

Where multiple propulsion modules are present (e.g., multiple instances of a specific type of propulsion module, multiple different types of propulsion modules, or combinations thereof), the multiple propulsion modules may be controlled independently, collectively in groups, or completely collectively. As one example, in an example where system 2 includes multiple propulsion modules 12, each of propulsion modules 12 may be independently controlled. As another example, in an example where system 2 includes multiple propulsion modules 12, all of propulsion modules 12 may be collectively controlled. As another example, in an example where system 2 includes multiple propulsion modules 12, a first set of propulsion modules 12 may be collectively controlled and a second set of propulsion modules 12 may be collectively controlled independently from the first set of propulsion modules 12.

Figure 3:
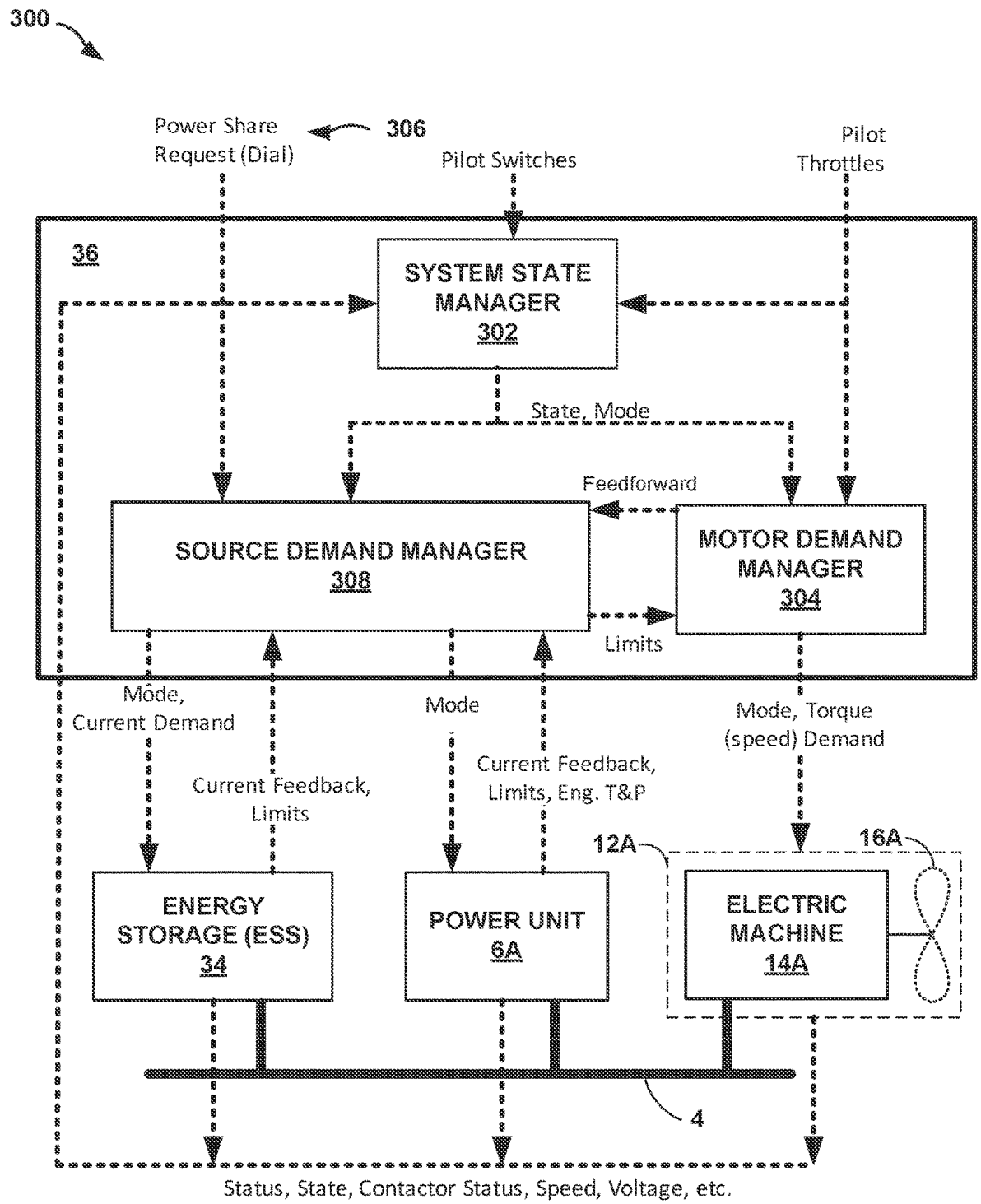
FIG. 3 is a conceptual block diagram illustrating a system that includes a hybrid propulsion system and a controller, in accordance with one or more techniques of this disclosure.

FIG. 3 is a conceptual block diagram illustrating a system 300 that includes a hybrid propulsion system and a controller 36, in accordance with one or more techniques of this disclosure. System 300 may represent one example of system 2 of FIG. 2 that includes controller 36, power unit 6A, ESS 34, propulsion module 12A, and electrical bus 4 providing an electrical power interconnection between power unit 6A, ESS 34, and propulsion module 12A. System 300 may also include system state manager 302 and motor demand manager 304, and source demand manager 308, the functions of any of which may be performed by controller 36. Although the example system 300 illustrated in FIG. 3 shows a single ESS 34, power unit 6A, and propulsion module 12A, in some examples system 300 may include one or more of each of ESS 34, power unit 6A, and propulsion module 12A.

System state manager 302 provides information to one or more controllers and/or system managers relating to the state and mode of a plurality of control switches and settings of various vehicle systems. For example, system state manager 302 may receive throttle input relating to propulsion, and output information relating to throttle input to controller 36 and motor demand manager 304, such as the state and mode of throttle input. In some examples, system state manager 302 may receive switch input such as user input relating to one or more systems of the vehicle. For example, system state manager 302 may receive switch input relating to hotel loads, communications, mechanical systems and the like, and may output information relating to the received input to the appropriate system and/or controller controlling the appropriate system. In some examples, system state manager 302 may receive feedback from various components of system 300, such as ESS 34, power unit 6A, and propulsion module 12A. For example, system state manager 302 may receive information relating to device status, state, contactor status, speed, voltage, and the like.

Motor demand manager 304 provides information and control commands to propulsion module 12A. For example, motor demand manager 304 may receive information relating to throttle input including throttle state and mode from system state manager 302 and output information, such as propulsion module 12A mode, and control commands such as a specified torque and/or speed of electric machine 14A. In some examples, motor demand manager 304 may receive throttle input directly and output information and commands. In some examples, motor demand manager 304 may receive information from one or more source demand managers 308, such as limits on propulsion module 12A, and output information and commands.

Source demand manager 308 may control the operation of one or more components of system 300 and system 2, as described above with respect to FIG. 2. For example, source demand manager 308 may receive input information and commands from system state manager 302, such as one or more states and modes, and other inputs, such as power share request 306. Source demand manager 308 may output information and control commands, such as mode and electrical current demand, to ESS 34 and/or power unit 6A. source demand manager 308 may receive information from ESS 34 and/or power unit 6A, for example, feedback relating to electrical current, limits of ESS 34 and power unit 6A, engine temperatures and pressures, and the like. In some examples, limits of various components of system 300, e.g., ESS 34, power unit 6A, propulsion module 12A, may include predetermined output limits which may be set and/or changed. Limits may also include the output capability and/or capacity limits of various components of system 300, e.g., the maximum output of ESS 34 and/or power unit 6A, which may change depending on environmental conditions, faults and/or fault conditions, material degradation of ESS 34 and/or power unit 6A, and the like.

Controller 36 may determine a first amount of power to be sourced from ESS 34 and second amount of power to be sourced from power unit 6A to meet a power demand and/or request for power for an amount of power to be used to propel the vehicle. In some examples, controller 36 may determine a plurality of amounts of power to be sourced from a plurality of ESS's and power units. In some examples, controller 36 may determine the first and second amounts of power based on any or all of the power demand, power share request 306, and feedback information including electrical current feedback and limits of various components of system 300, e.g., ESS 34, power unit 6A, and propulsion module 12A. Controller 36 may output the determined first amount of power to ESS 34 and the determined second amount of power to power unit 6A. In some examples, controller 36 may output limits to motor demand manager 304 and may receive information relating to feed-forwarding from motor demand manager 304. For example, motor demand manager 304 may apply limits to the power demanded by pilot throttles so that the motor demand cannot exceed the total power available, e.g. due to degraded components. This total power available limit may be determined by source demand manager 308 using system status information such as fixed predetermined limits, state and mode information from the system state manager 302, limit feedback from the ESS 34 and power unit 6A, as well as combustion engine temperatures and pressures from power unit 6A (which may define engine limits).

Power share request 306 may provide a criteria for sourcing of the electrical power of system 300 and setting output limits for ESS 34 and/or power unit 6A. For example, the amount of power of a power demand supplied by each of ESS 34 and power unit 6A may be determined based on power share request 306. In some examples, a predetermined ESS limit may be determined based on power share request 306, and in some examples the predetermined ESS limit may be power share request 306. In some examples, power share request 306 may correspond to a percentage of a fixed power demand, e.g., a fixed request for power and/or a total power required. In some example, controller 36 may receive a plurality of power share requests 306, for example, a power share request for each of a plurality of ESS's and power units. In some examples, a user may input a power share request, for example, via a dial, lever, touch screen input, typed input, or any other appropriate means. In other examples, a power share request may be determined via a control algorithm and/or a schedule.

Figure 4:
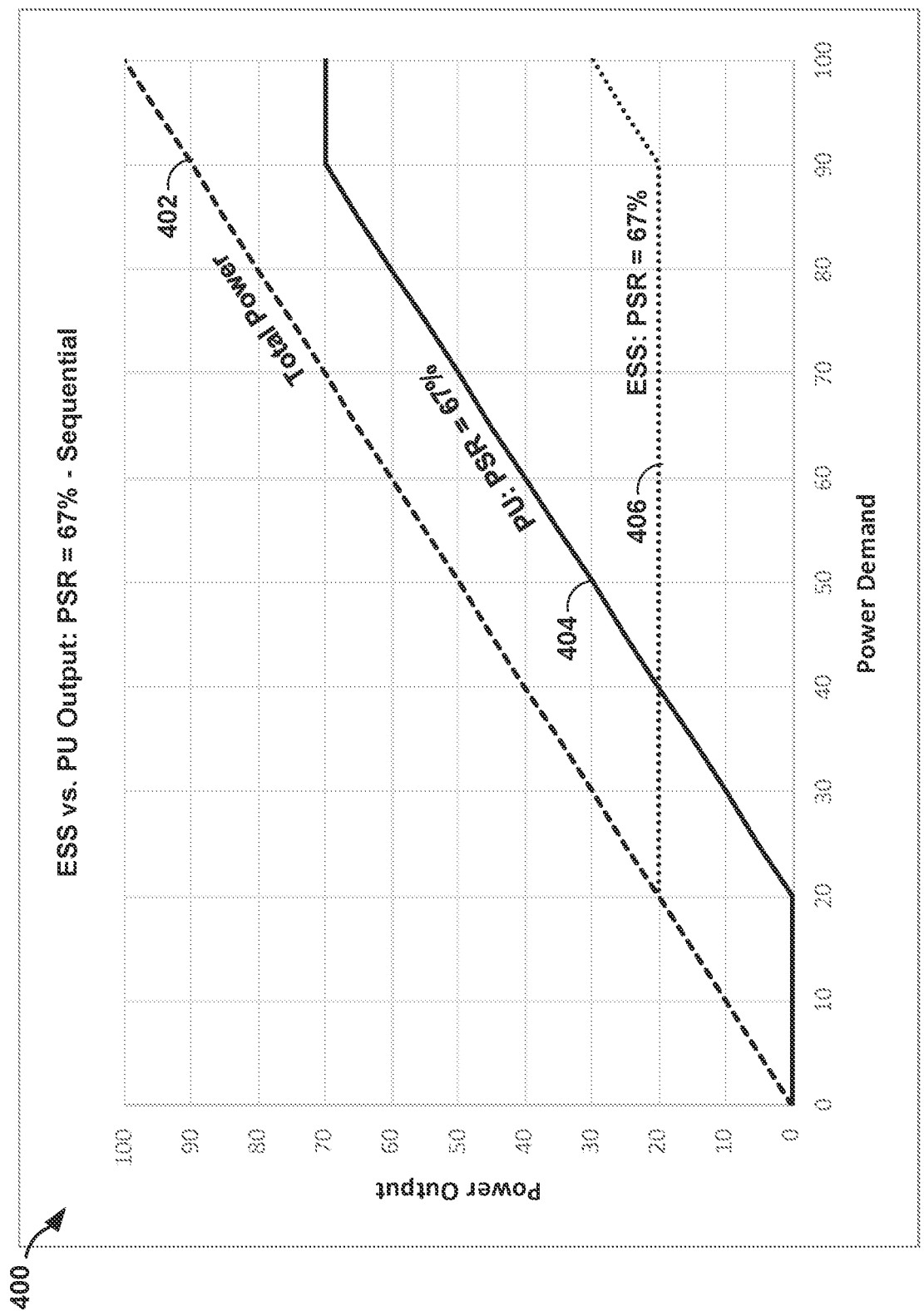
FIG. 4 is a plot illustrating an example sequential power management method, in accordance with one or more techniques of this disclosure.
Figure 5:
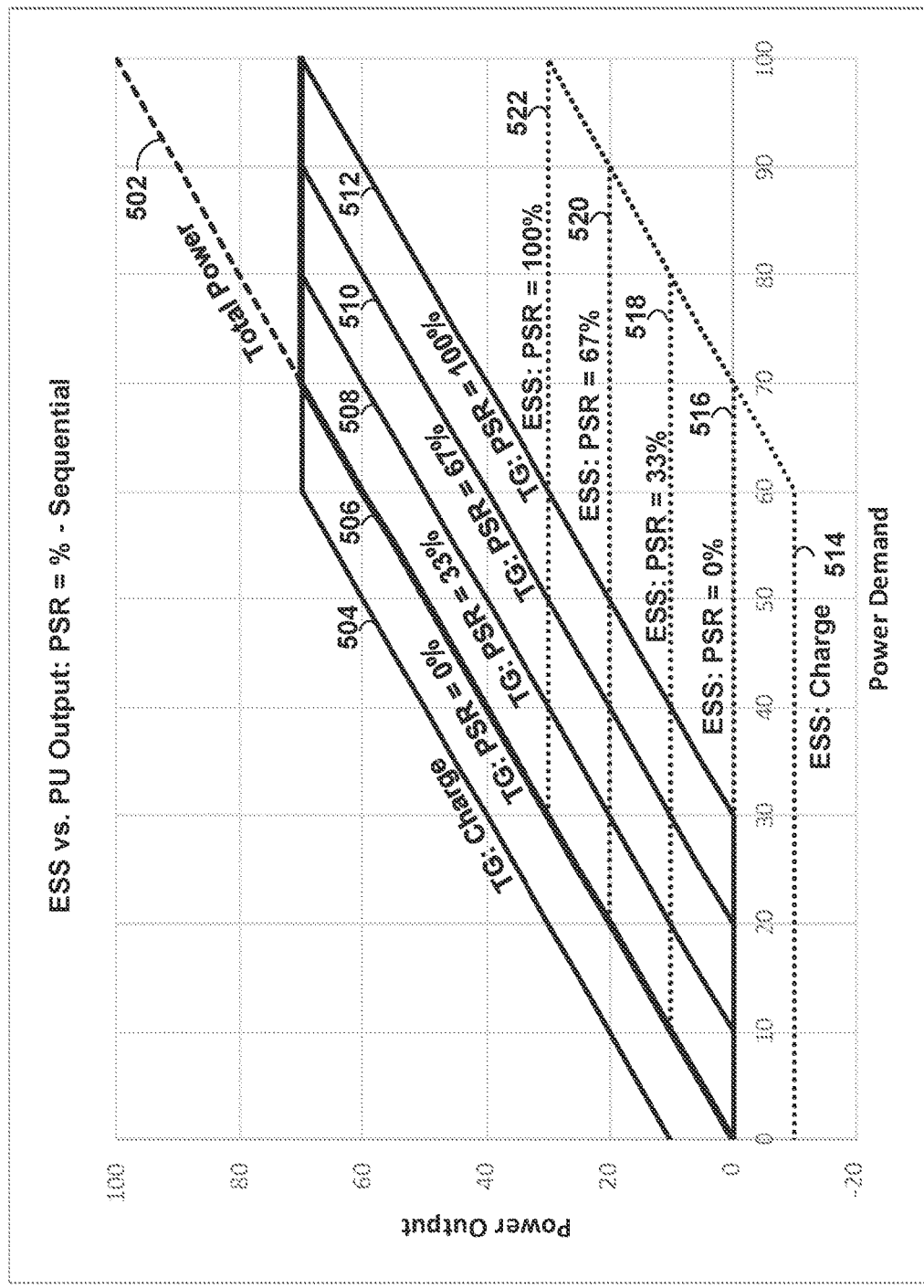
FIG. 5 is a plot illustrating another example sequential power management method, in accordance with one or more techniques of this disclosure.
Figure 6:
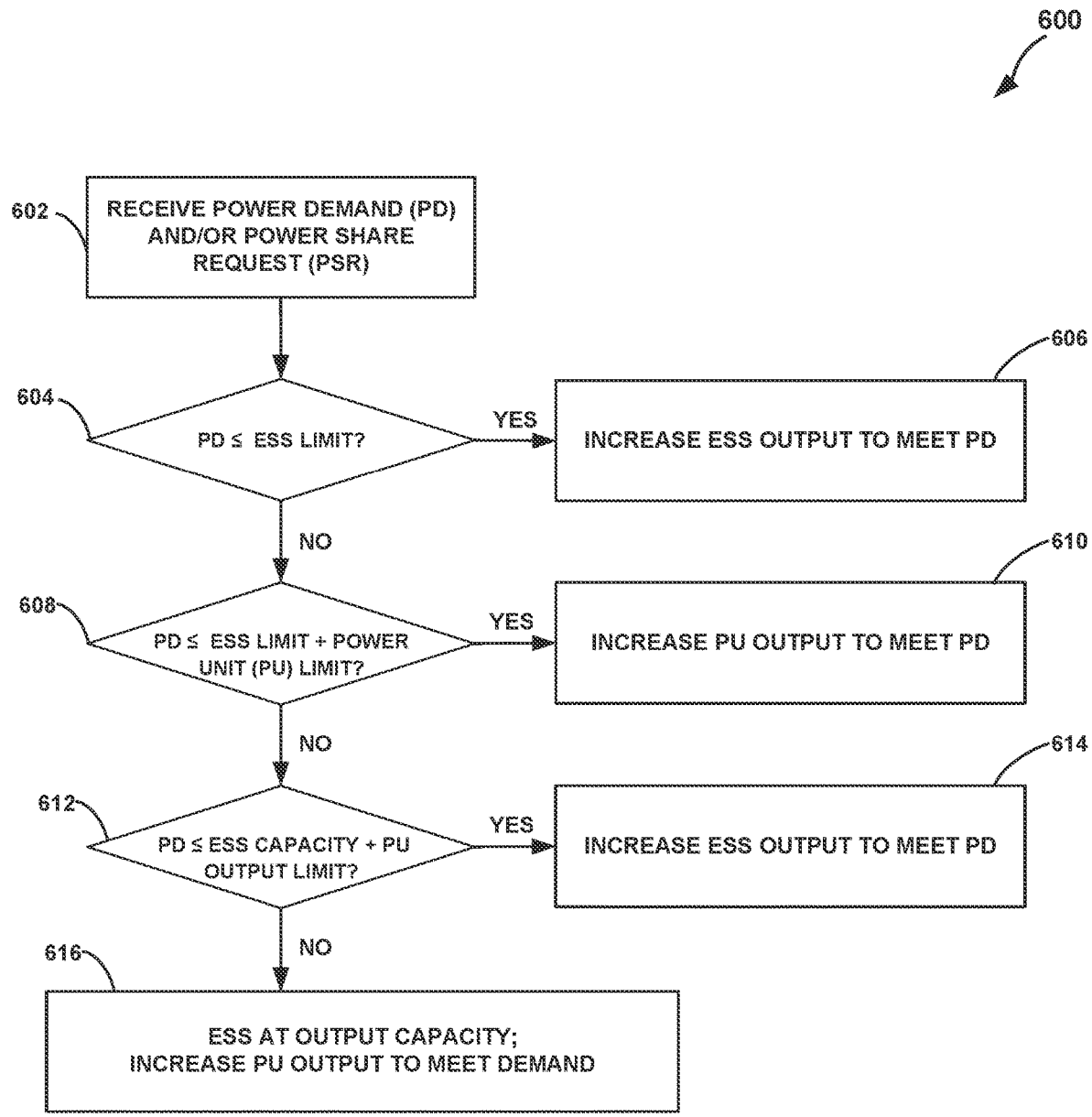
FIG. 6 is a flowchart of an example method of sequential power management in a hybrid propulsion system, in accordance with one or more techniques of this disclosure.

FIGS. 4-6 illustrate an example sequential power management method 600 and are described concurrently with reference to each other below.

FIG. 4 is an example plot 400 illustrating example power output as a function of power demand curves 402-406 for a power share request of 67%, in accordance with one or more techniques of this disclosure. In the example shown, total power curve 402 is the sum of power unit curve 404 and ESS curve 406, with power unit 6A providing up to 70% of the total available power and ESS 34 providing up to 30% of the total available power, e.g., a 70/30 power unit-to-ESS ratio or a "70/30 ratio." In other words, the output capacity and/or limits of the power sources interconnected via bus 4 to propulsion loads, namely ESS 34 and power units 6, may not be the same and each may be a proportion of the total output power available to meet power demand. In some examples of sequential power management method 600, a power share request may specify a portion of the ESS output capacity, e.g., an ESS output limit, below which the system may use the ESS to meet an increasing and/or changing power demand, and above which the system prioritizes other power sources. In the examples shown in FIGS. 4-6, the output capacity of the ESS is 30% of the total available power, and a 67% power share request results in an ESS output limit of 20% of the total available power, e.g., 67% of the 30% ESS output capacity.

FIG. 5 is an example of a plurality of plots 500 illustrating example power output as a function of power demand curves 502-522 for a plurality of power share requests, in accordance with one or more techniques of this disclosure. The example shown illustrates various ESS curves and power unit curves for various power share requests. Similar to plot 400, plot 500 illustrates the power output versus power demand curves 502-522 for a 70/30 power unit-to-ESS ratio. Total power curve 502 is the sum of corresponding power unit curves and ESS curves, e.g., the sum of power unit curve 504 and ESS curve 514, the sum of power unit curve 506 and ESS curve 516, etc.

FIG. 6 is a flowchart of an example method 600 of sequential power management in a hybrid propulsion system, in accordance with one or more techniques of this disclosure. The example method 600 may be performed, for example, by controller 36 executing the steps of the method.

A power demand and/or a power share request may be received (602). For example, a user may provide input via a throttle, switch, etc., which may be converted to a power demand by system state manager 302, motor demand manager 304, source demand manager 308, and/or controller 36. In some examples, a power share request may be input by a user, or a power share request may originate from another system component that determines the power share request via a control algorithm or according to a schedule, or power share request may be determined by controller 36 via a control algorithm or according to a schedule. An ESS output limit may be determined based on the power share request.

Whether the power demand is less than or equal to the ESS output limit may be determined (604). If the power demand is less than or equal to the ESS output limit, ESS output may be adjusted and/or changed to meet the power demand (606). For example, controller 36 may cause ESS 34 to increase and/or decrease output to meet the power demand. In some examples, ESS output may displace power unit output. For example, power unit 6A may be a voltage regulator of electrical bus 4. As total required power increases, the voltage on electrical bus 4 may decrease and power unit 6A, as voltage regulator, may increase output so as to increase the voltage on electrical bus 4 to a predetermined voltage or voltage range. Alternatively, as total required power decreases, the voltage on electrical bus 4 may increase and power unit 6A, as voltage regulator, may decrease output so as to decrease the voltage on electrical bus 4 to a predetermined voltage or voltage range. At (606), ESS 34 output may be adjusted to displace the adjusted output of the voltage regulator, e.g., power unit 6A. In some examples, ESS 34 may be a voltage regulator, and in other examples other components of the system may be a voltage regulator. For example, by utilizing droop control, any or all of ESS 34, power unit 6A, and electric machine 14A may be voltage regulators concurrently.

In the example illustrated in FIG. 4, the power share request of 67% results in an ESS output limit that is 20% of the total available output power, as described above. In the example shown, ESS curve 406 increases and/or decreases with a 1:1 correspondence to the power demand for a power demand from 0% up to and including 20% and is equal to and overlaps with total power output curve 402 within that range. Power unit curve 404 remains at 0% for a power demand from 0% up to and including 20%. In the example shown, the power share request of 67% for the sequential method 600 results in all of the power demand being sourced from ESS 34 for a power demand less than or equal to the ESS output limit of 20%.

FIG. 5 illustrates ESS and power unit curves for other power share request values. In the example illustrated in FIG. 5, power unit curve 508 and ESS curve 518 correspond to a 33% power share request, resulting in an ESS output limit of 10% of the total output power based on the example 70/30 ratio. ESS curve 518 increases and/or decreases with a 1:1 correspondence to the power demand for a power demand from 0% up to and including 10% and is equal to and overlaps with total power output curve 502 within that range. Power unit curve 508 remains at 0% for a power demand of 0% up to and including 10%. In the example shown, the power share request of 33% for the sequential method 600 results in all of the power demand being sourced from ESS 34 for a power demand less than or equal to the ESS output limit of 10%.

Power unit curve 510 and ESS curve 520 correspond to a 67% power share request, similar to the example illustrated in FIG. 4 above.

Power unit curve 512 and ESS curve 522 correspond to a 100% power share request, resulting in an ESS output limit of 30% of the total output power based on the example 70/30 ratio. ESS curve 522 increases and/or decreases with a 1:1 correspondence to the power demand for a power demand from 0% up to and including 30% and is equal to and overlaps with total power output curve 502 within that range. Power unit curve 512 remains at 0% for a power demand from 0% up to and including 30%. In the example shown, the power share request of 100% for the sequential method 600 results in all of the power demand being sourced from ESS 34 for a power demand less than or equal to the ESS output limit of 30%.

Returning now to FIG. 6, if the power demand is not less than or equal to ESS output limit at (604), whether the power demand is less than or equal to the sum of the ESS output limit and the power unit output limit may be determined (608). If the power demand is less than or equal to the sum of the ESS output limit and the power unit output limit, the power unit may increase and/or decrease power to meet the power demand (610). For example, controller 36 may cause power unit 6A to increase and/or decrease output power to meet the power demand.

In the example illustrated in FIG. 4, power unit curve 404 increases and/or decreases with a 1:1 correspondence to the power demand for a power demand greater than 20%. The power unit output limit is 70% of the total output power based on the example 70/30 ratio, and power unit curve 404 increases and/ or decreases in 1:1 correspondence to the power demand up to and including a power demand of 90%, e.g., the sum of the ESS output limit and the power unit output limit. ESS curve 406 remains constant at 20% for a power demand greater than 20% up to and including 90%. In the example shown, the power share request of 67% for the sequential method 600 results in 20% of the power demand, e.g., the ESS output limit, being sourced from ESS 34 and the rest of the power demand being sourced from power unit 6A for a power demand that is less than or equal to the sum of the ESS output limit and the power unit output limit at (610).

In the examples illustrated in FIG. 5, power unit curve 506 and ESS curve 516 correspond to a 0% power share request, resulting in an ESS output limit of 0% of the total output power. Power unit curve 506 increases and/or decreases with a 1:1 correspondence to the power demand for a power demand from greater than 0% up to and including 70%, e.g., from greater than 0% to the sum of the ESS output limit and the power unit output limit. ESS curve 516 remains constant at 0% for a power demand from greater than 0% up to and including 70%. In the example shown, the power share request of 0% for the sequential method 600 results in 0% of the power demand, e.g., the ESS output limit, being sourced from ESS 34 and the rest of the power demand being sourced from power unit 6A for a power demand less than or equal to the sum of the ESS output limit and the power unit output limit at (610).

Power unit curve 508 and ESS curve 518 correspond to a 33% power share request, resulting in an ESS output limit of 10% of the total output power. Power unit curve 508 increases and/or decreases with a 1:1 correspondence to the power demand for a power demand from greater than 10% up to and including 80%, e.g., from greater than 10% to the sum of the ESS output limit and the power unit output limit. ESS curve 518 remains constant at 10% for a power demand greater than 10% up to and including 80%. In the example shown, the power share request of 33% for the sequential method 600 results in 10% of the power demand, e.g., the ESS output limit, being sourced from ESS 34 and the rest of the power demand being sourced from power unit 6A for a power demand less than or equal to the sum of the ESS output limit and the power unit output limit at (610).

Power unit curve 510 and ESS curve 520 correspond to a 67% power share request, similar to the examples illustrated in FIG. 4 above.

Power unit curve 512 and ESS curve 522 correspond to a 100% power share request, resulting in an ESS output limit of 30% of the total output power. Power unit curve 512 increases and/or decreases with a 1:1 correspondence to the power demand for a power demand from greater than 30% up to and including 100%. ESS curve 522 remains constant at 30% for a power demand from greater than 30% up to and including 100%. In the example shown, the power share request of 100% for the sequential method 600 results in 30% of the power demand, e.g., the ESS output limit, being sourced from ESS 34 and the rest of the power demand being sourced from power unit 6A for a power demand less than or equal to the sum of the ESS output limit and the power unit output limit at (610).

In some examples, power share request 306 may be negative. In the example shown in FIG. 5, power unit curve 504 and ESS curve 514 illustrate a power share request of −33% resulting in an ESS output limit of −10% and corresponding to charging ESS 34, for example, via drawing power from electrical bus 4. Power unit 6A increases output to meet the power demand, which includes ESS 34 charging on electrical bus 4 in the example shown, as illustrated by power unit curve 504 having a 10% total power output at 0% power demand and ESS curve 514 having a −10% output (10% power draw to charge).

Returning now to FIG. 6, if the power demand is not less than or equal to the sum of the ESS output limit and the power unit output limit at (610), whether the power demand is less than or equal to the sum of the ESS output capacity and the power unit output limit (612). For example, the power share request and ESS output limit may be overridden to meet a power demand, such as a propulsion power demand.

If the power demand is less than or equal to the sum of the ESS output capacity and the power unit output limit at (612), ESS output may be increased and/or changed or decreased to meet the power demand (614). For example, controller 36 may override the power share request and ESS output limit and cause ESS 34 to increase and/or decreases output power to meet demand for a power demand less than or equal to the sum of the ESS output capacity and the power unit output limit.

In the example illustrated in FIG. 4, ESS curve 406 increases and/or decreases with a 1:1 correspondence to the power demand for a power demand from greater than 90% up to and including 100%. Power unit curve 404 remains constant at 70% for a power demand from greater than 90% up to and including 100%. In the example shown, the power share request of 67% for the sequential method 600 results in 70% of the power demand, e.g., the power unit output limit, being sourced from power unit 6A and the rest of the power demand being sourced from ESS 34 for a the power demand is less than or equal to the sum of the ESS output capacity and the power unit output limit at (614).

In the examples illustrated in FIG. 5, ESS curve 516 increases and/or decreases with a 1:1 correspondence to the power demand for a power demand from greater than 70% up to and including 100%. Power unit curve 506 remains constant at 70% for a power demand from greater than 70% up to and including 100%. In the example shown, the power share request of 0% for the sequential method 600 results in 70% of the power demand, e.g., the power unit output limit, being sourced from power unit 6A and the rest of the power demand being sourced from ESS 34 for a power demand is less than or equal to the sum of the ESS output capacity and the power unit output limit at (614).

ESS curve 518 increases and/or decreases with a 1:1 correspondence to the power demand for a power demand from greater than 80% up to and including 100%. Power unit curve 508 remains constant at 70% for a power demand from greater than 80% up to and including 100%. In the example shown, the power share request of 33% for the sequential method 600 results in 70% of the power demand, e.g., the power unit output limit, being sourced from power unit 6A and the rest of the power demand being sourced from ESS 34 for a power demand is less than or equal to the sum of the ESS output capacity and the power unit output limit at (614).

Power unit curve 510 and ESS curve 520 correspond to a 67% power share request, similar to the examples illustrated in FIG. 4 above.

Returning now to FIG. 6, if the power demand is not less than or equal to the sum of the ESS output capacity and the power unit output limit at (612), power unit output may be increased and/or decreased to meet the power demand (616). For example, the power unit output limit may be overridden to meet a power demand, such as a propulsion power demand. In some examples, the total available output power illustrated in FIGS. 4-5 is the total output power according to power unit and ESS limits and is less than the total possible power output. Total possible output power may be based on the peak power outputs of the power units and the output capacities of the ESS's.

Sequential power management method 600 may be used for increasing and/or decreasing power demands. For example, the power outputs of ESS 34 and power unit 6A illustrated in FIGS. 4-5 may be valid for a power demand that is adjusted to increase and/or decrease.

Figure 7:
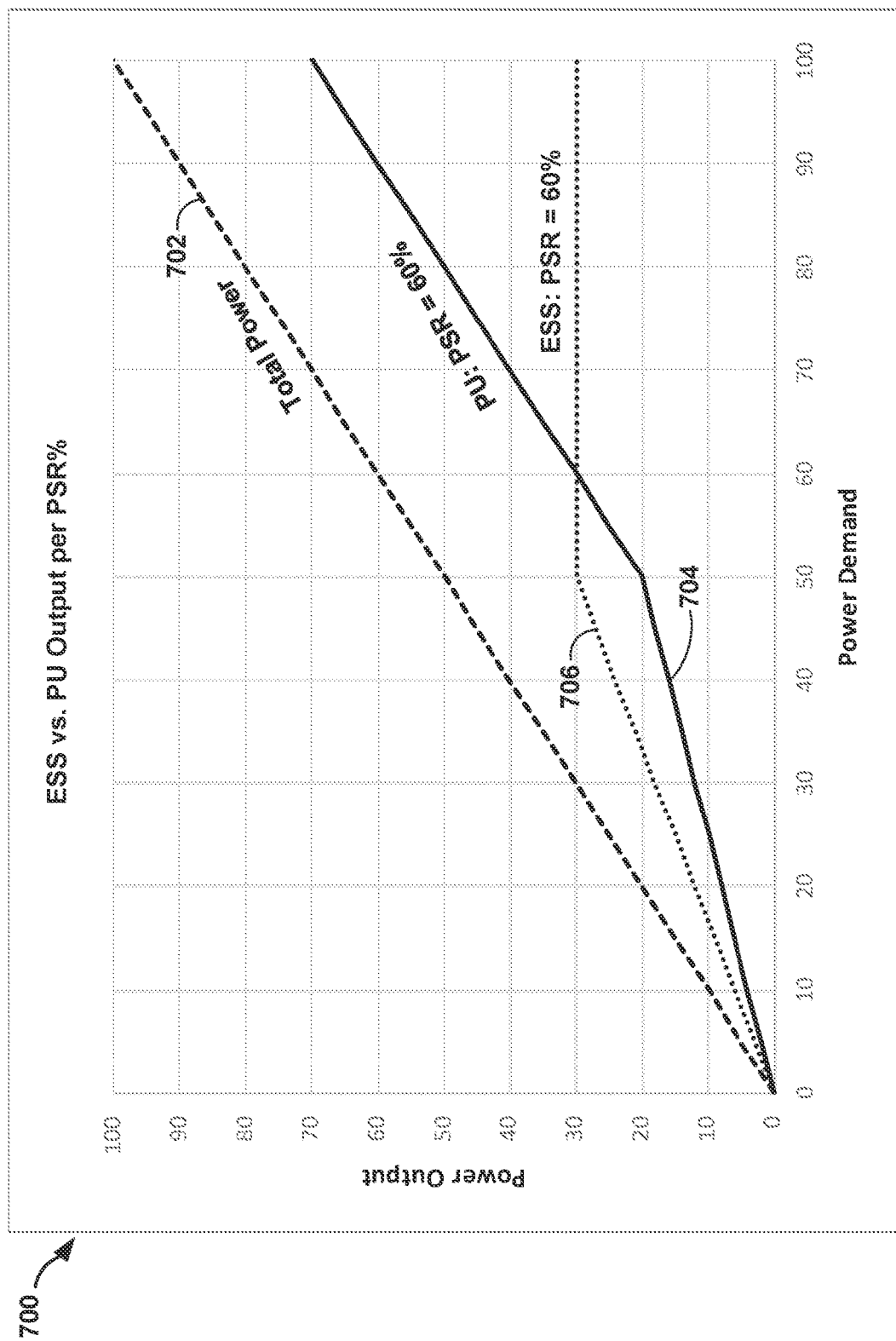
FIG. 7 is a plot illustrating an example continuous power management method, in accordance with one or more techniques of this disclosure.
Figure 8:
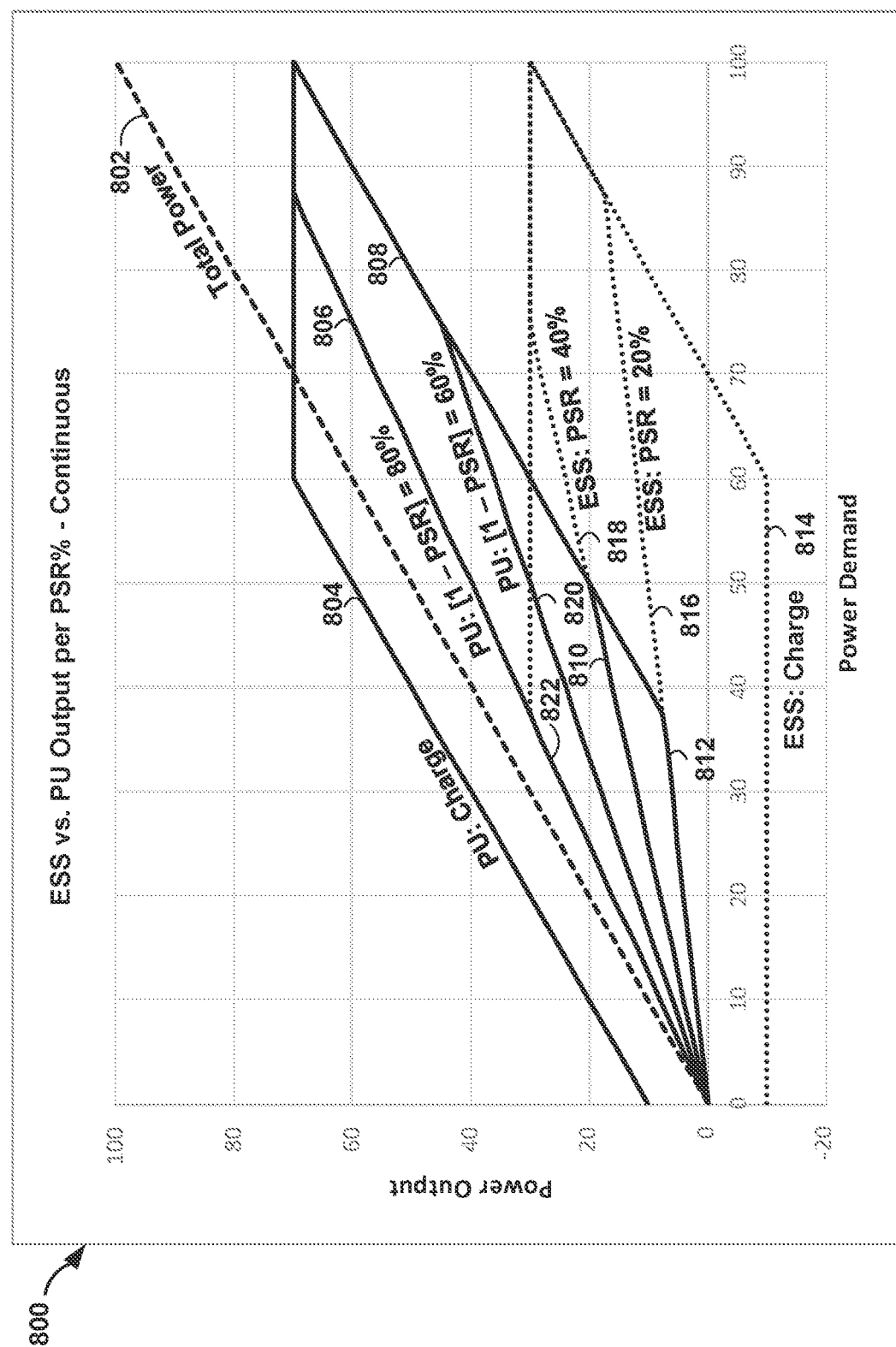
FIG. 8 is a plot illustrating another example continuous power management method, in accordance with one or more techniques of this disclosure.
Figure 9:
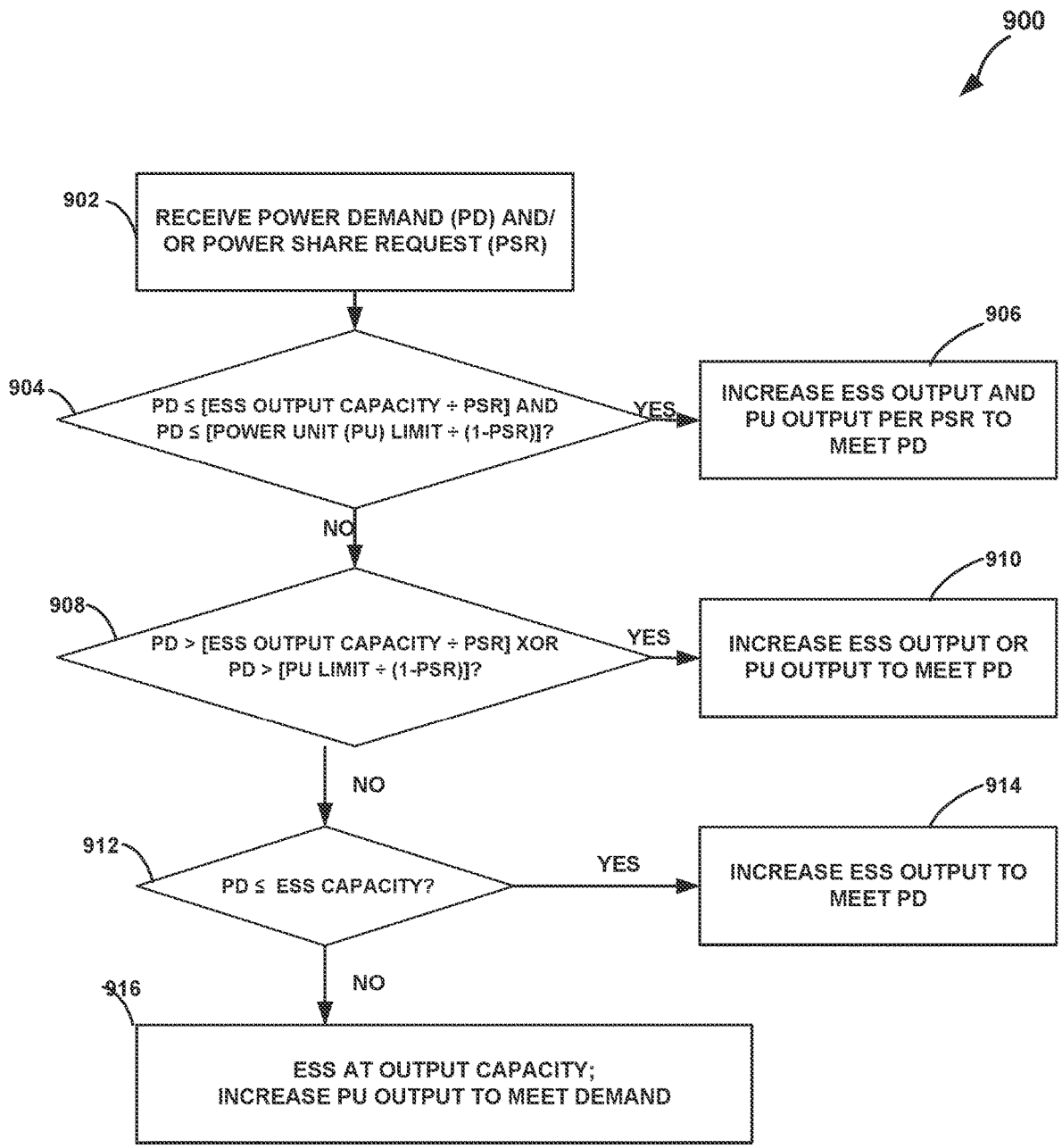
FIG. 9 is a flowchart of an example method of continuous power management in a hybrid propulsion system, in accordance with one or more techniques of this disclosure.

FIGS. 7-9 illustrate an example continuous power management method 900 and are described concurrently with reference to each other below. Some of the example power share requests illustrated in FIGS. 7-9 are different from those of FIGS. 4-6 for improved visibility in the plots and to better illustrate the differences between continuous power management method 900 and sequential power management method 600.

FIG. 7 is an example plot 700 illustrating example power output as a function of power demand curves 702-706 for a power share request of 60%, in accordance with one or more techniques of this disclosure. In the example shown, total power curve 702 is the sum of power unit curve 704 and ESS curve 706 for a 70/30 power unit-to-ESS power ratio as described above with respect to FIG. 4.

In some examples of continuous power management method 900, a power share request may specify a ratio of the power demand to be sourced from a plurality of power sources, namely the ESS and the power unit, for power demands less than or equal to the output capacity of the ESS or the power unit output limit. In the examples shown in FIGS. 7-9, the output capacity of the ESS is 30% of the total available power and the power unit output limit is 70%, per the 70/30 power unit-to-ESS power ratio of the examples. A 60% power share request results in a 60% of the power demand being sourced by the ESS and 40% of the power demand being sourced by the power unit for a power demand less than or equal to the ESS output capacity divided by the power sharing request in the examples of FIGS. 7-9. In other words, a power demand equal to the ESS output capacity divided by the power share request (as a decimal from 0 to 1, e.g., representing an output sharing percentage) is the power demand at which the ESS output capacity is reached. In the example of FIG. 7, the ESS output capacity is reached at 50%, e.g., 30%÷60%, or 0.3÷0.6.

FIG. 8 is an example of a plurality of plots 800 illustrating example power output as a function of power demand curves 802-822 for a plurality of power share requests, in accordance with one or more techniques of this disclosure. Similar to plot 700, plot 800 illustrates the power output versus power demand curves 802-822 for a 70/30 power unit-to-ESS ratio. Total power curve 802 is the sum of corresponding power unit curves and ESS curves, e.g., the sum of power unit curve 804 and ESS curve 814, the sum of power unit curve 806 and ESS curve 816, etc. In some of the examples of plot 800, certain power share request values result in the ESS reaching its output capacity to meet a power demand before the power unit output limit is reached, which is the situation described above with respect to FIG. 7. In other examples of plot 800, certain other power share request values result in the power unit reaching its output limit to meet a power demand before the ESS reaches its output capacity. The point at which the power unit reaches its output capacity is a power demand equal to the power limit output limit divided by 100% minus the power share request. In other words, a power demand equal to the power unit output limit divided by one minus the power share request (as a decimal from 0 to 1, e.g., representing an output sharing percentage) is the power demand at which the power unit output limit is reached. For example, for a power share request of 20% illustrated by ESS curve 816 and power unit curve 806 of FIG. 8, the power unit output limit is reached at 87.5%, e.g., 70%÷(100%-20%), or 0.7÷(1−0.2).

FIG. 9 is a flowchart of an example method 900 of continuous power management in a hybrid propulsion system, in accordance with one or more techniques of this disclosure. The example method 900 may be performed, for example, by controller 36 executing the steps of the method.

A power demand and/or a power share request may be received (902). For example, a user may provide input via a throttle, switch, etc., which may be converted to a power demand by system state manager 302, motor demand manager 304, source demand manager 308, and/or controller 36. In some examples, a power share request may be input by a user, or a power share request may originate from another system component that determines the power share request via a control algorithm or according to a schedule, or power share request may be determined by controller 36 via a control algorithm or according to a schedule.

Whether the power demand is less than or equal to the ESS output capacity divided by the power share request and less than the power unit output limit divided by one minus the power share request may be determined (904). To simplify the description herein, the ESS output capacity divided by the power share request will be referred to as the "ESS condition" for the continuous power management method 900 and the power unit output limit divided by one minus the power share request will be referred to as the "power unit condition" for the continuous power management method 900. If the power demand is less than or equal to both the continuous power management method ESS and power unit conditions, both ESS output and power unit output may be increased, decreased, and/or changed or adjusted to meet the power demand (906). For example, controller 36 may cause both ESS 34 and power unit 6A to increase and/or decrease output to meet the power demand. In some examples, ESS output may displace power unit output. For example, power unit 6A may be a voltage regulator of electrical bus 4. As total required power increases, the voltage on electrical bus 4 may decrease and power unit 6A, as voltage regulator, may increase output so as to increase the voltage on electrical bus 4 to a predetermined voltage or voltage range. Alternatively, as total required power decreases, the voltage on electrical bus 4 may increase and power unit 6A, as voltage regulator, may decrease output so as to decrease the voltage on electrical bus 4 to a predetermined voltage or voltage range. At (906), ESS 34 output may be increased and/or decreased to displace at least a portion of the increased and/or decreased output of the voltage regulator, e.g., power unit 6A. In some examples, ESS 34 may be a voltage regulator, and in other examples other components of the system may be a voltage regulator. For example, by utilizing droop control, any or all of ESS 34, power unit 6A, and electric machine 14A may be voltage regulators concurrently.

In the example illustrated in FIG. 7, the power share request of 60% results in an ESS power output that is 60% of the power demand and a power unit output that is 40% of the power demand less than or equal to 50%, at which point the ESS condition is met and the ESS output has reached its 30% output capacity. In the example shown, the ESS curve 706 increases and/or decreases with a 0.6:1 correspondence to the power demand for a power demand of 0% to 50%. Power unit curve 704 increases and/or decreases with a 0.4:1 correspondence to the power demand for a power demand less than or equal to 50%.

FIG. 8 illustrates ESS and power unit curves for other power share request values. Power unit curve 806 and ESS curve 816 correspond to a 20% power share request resulting in an ESS power output that is 20% of the power demand and a power unit output that is 80% of the power demand for a power demand that is less than equal to 87.5%, at which point the power unit condition is met and the power unit has reached its 70% output limit. For a power share request of 20%, the power unit condition is less than the ESS condition. ESS curve 816 increases and/or decreases with a 0.2:1 correspondence to the power demand and power unit curve 806 increases and/or decreases with a 0.8:1 correspondence to the power demand for a power demand less than or equal to the power unit condition, e.g., 87.5%.

Power unit curve 808 and ESS curve 818 correspond to a 40% power share request, resulting in an ESS power output that is 40% of the power demand and a power unit output that is 60% of the power demand for a power demand that is less than or equal to 75%, at which point the ESS condition is met and the ESS has reached its 30% output capacity. For a power share request of 40%, the ESS condition is less than the power unit condition. ESS curve 818 increases and/or decreases with a 0.4:1 correspondence to the power demand and power unit curve 808 increases and/or decreases with a 0.6:1 correspondence to the power demand for a power demand less than or equal to the ESS condition, e.g., 75%.

Power unit curve 810 and ESS curve 820 correspond to a 60% power share request, similar to the example illustrated in FIG. 7 above.

Power unit curve 812 and ESS curve 822 correspond to an 80% power share request, resulting in an ESS power output that is 80% of the power demand and a power unit output that is 20% of the power demand for a power demand that is less than or equal to 37.5%, at which point the ESS condition is met and the ESS has reached its 30% output capacity. For a power share request of 80%, the ESS condition is less than the power unit condition. ESS curve 822 increases and/or decreases with a 0.8:1 correspondence to the power demand and power unit curve 812 increases and/or decreases with a 0.2:1 correspondence to the power demand for a power demand less than or equal to the ESS condition, e.g., 37.5%.

In some examples, power share request 306 may be negative, as described above with respect to FIG. 5. Similarly, in the example shown in FIG. 8, power unit curve 804 and ESS curve 814 illustrate a negative power share request resulting in the ESS drawing power from electrical bus 4 to charge. Power unit 6A increases output to meet the power demand, which includes ESS 34 charging on electrical bus 4 in the example shown and as described above.

Returning now to FIG. 9, if the power demand is not less than or equal to both the ESS condition and the power unit condition at (904), whether the power demand is greater than either of the ESS condition and power unit condition and less than the sum of the ESS output capacity and power unit output limit may be determined (908). If the power demand is greater than either of the ESS condition and power unit condition but less than or equal to the sum of the ESS capacity and power unit output limit (e.g., 100%), one or the other, but not both, of the ESS and the power unit may increase and/or decrease power to meet the power demand (910). For example, controller 36 may cause ESS 34 to increase and/or decrease output power to meet a power demand that is greater than the power unit condition but not greater than 100%. Alternatively, controller 36 may cause power unit 6A to increase and/or decrease output power to meet a power demand that is greater than the ESS condition but not greater than 100%.

In the example illustrated in FIG. 7, power unit curve 704 increases and/or decreases with a 1:1 correspondence to the power demand and ESS curve 706 remains constant at the ESS output capacity 30% for a power demand greater than the ESS condition, 50%, but less than the power unit condition, 175%. The power unit condition of 175% indicates that the power unit output limit would not otherwise be reached before the total power demand reaches 100% if the 60/40 ESS to power unit ratio were allowed to continue. In the example shown, the power share request of 60% for the continuous power management method 900 results in 30% of the power demand, e.g., the ESS output capacity, being sourced from ESS 34 and the rest of the power demand being sourced from power unit 6A for a power demand greater than the ESS condition and less than the power unit condition.

In the examples illustrated in FIG. 8, ESS curve 816 increases and/or decreases with a 1:1 correspondence to the power demand and power unit curve 806 remains constant at the power unit output limit 70% for a power demand greater than the power unit condition, 87.5%, but less than the ESS condition, 150%, based on the 20% power share request. The ESS condition of 150% indicates that the ESS output capacity would not otherwise be reached before the total power demand reaches 100% if the 20/80 ESS to power unit ratio were allowed to continue. In the example shown, the power share request of 20% for the continuous power management method 900 results in 70% of the power demand, e.g., the power unit output limit, being sourced from power unit 6A and the rest of the power demand being sourced from ESS 34 for a power demand greater than the power unit condition and less than the ESS condition.

Power unit curve 808 increases and/or decreases with a 1:1 correspondence to the power demand and ESS curve 818 remains constant at the ESS output capacity 30% for a power demand greater than the ESS condition, 75%, but less than the power unit condition, 117%, based on the 40% power share request. Similar to the example of FIG. 7, the power unit condition of 117% indicates that the power unit output limit would not otherwise be reached before the total power demand reaches 100% if the 40/60 ESS to power unit ratio were allowed to continue. In the example shown, the power share request of 40% for the continuous power management method 900 results in 30% of the power demand, e.g., the ESS output capacity, being sourced from ESS 34 and the rest of the power demand being sourced from power unit 6A for a power demand greater than the ESS condition and less than the power unit condition.

Power unit curve 810 and ESS curve 820 correspond to a 60% power share request, similar to the examples illustrated in FIG. 7 above.

Power unit curve 812 increases and/or decreases with a 1:1 correspondence to the power demand and ESS curve 822 remains constant at the ESS output capacity 30% for a power demand greater than the ESS condition, 37.5%, but less than the power unit condition, 350%, based on the 20% power share request. Similar to the example of FIG. 7, the power unit condition of 350% indicates that the power unit output limit would not otherwise be reached before the total power demand reaches 100% if the 40/60 ESS to power unit ratio were allowed to continue. In the example shown, the power share request of 40% for the continuous power management method 900 results in 30% of the power demand, e.g., the ESS output capacity, being sourced from ESS 34 and the rest of the power demand being sourced from power unit 6A for a power demand greater than the ESS condition and less than the power unit condition.

Returning now to FIG. 9, if the power demand is not less than or equal to the sum of the output capacity and the power unit output limit, e.g., 100%, power unit output may be increased and/or decreased to meet the power demand (914). For example, the power unit output limit may be overridden to meet a power demand, such as a propulsion power demand. In some examples, the total output power illustrated in FIGS. 7-8 is the total output power according to power unit and ESS limits. Total available output power may be based on the peak power outputs of the power units and the output capacities of the ESS's and may be greater than the total output power illustrated in FIGS. 7-8.

Continuous power management method 900 may be used for increasing and/or decreasing power demands. For example, the power outputs of ESS 34 and power unit 6A illustrated in FIGS. 7-8 may be valid for a power demand that is adjusted to increase and/or decrease.

Figure 10:
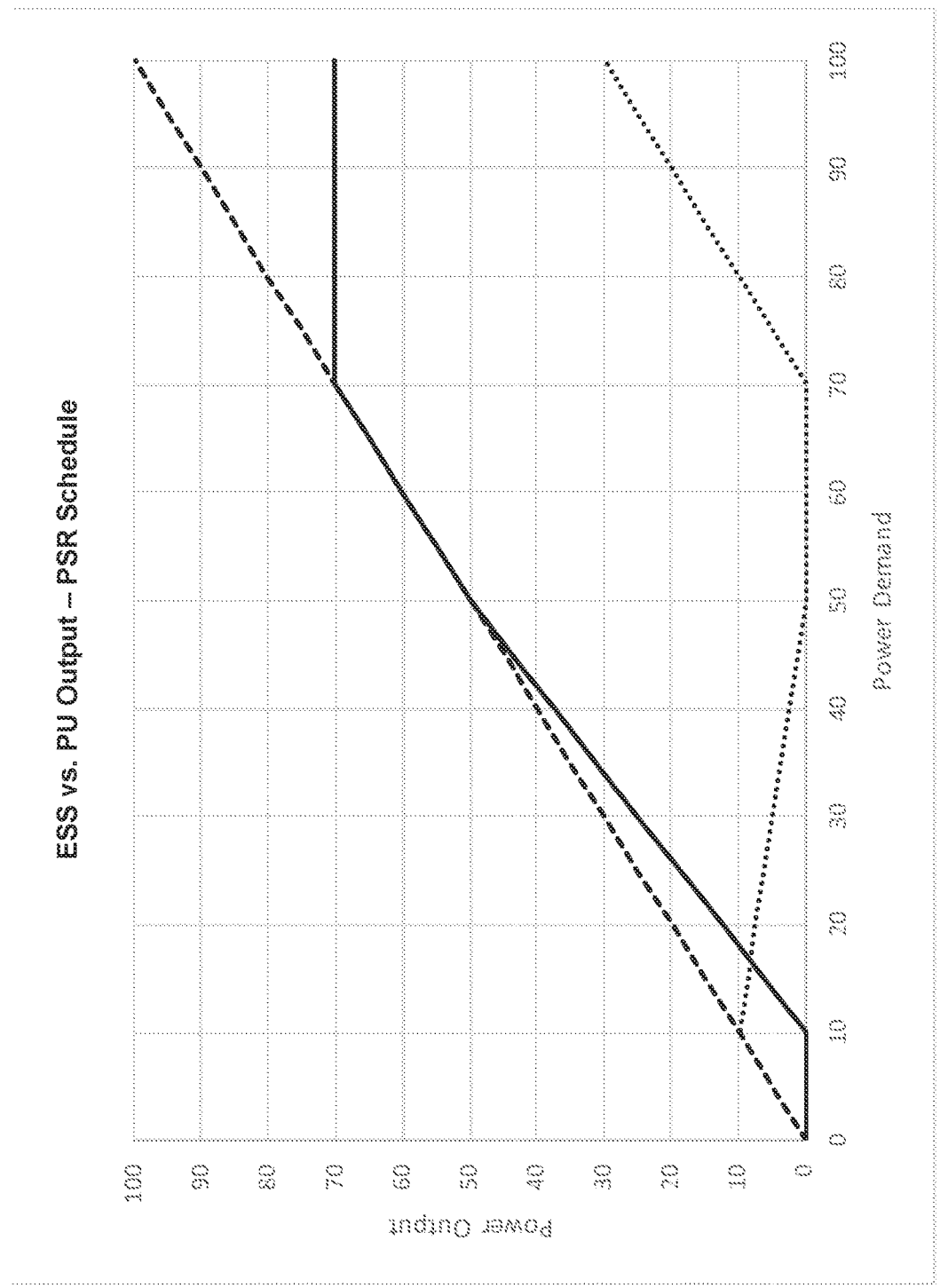
FIG. 10 is a plot illustrating an example scheduled power management method, in accordance with one or more techniques of this disclosure.
Figure 11:
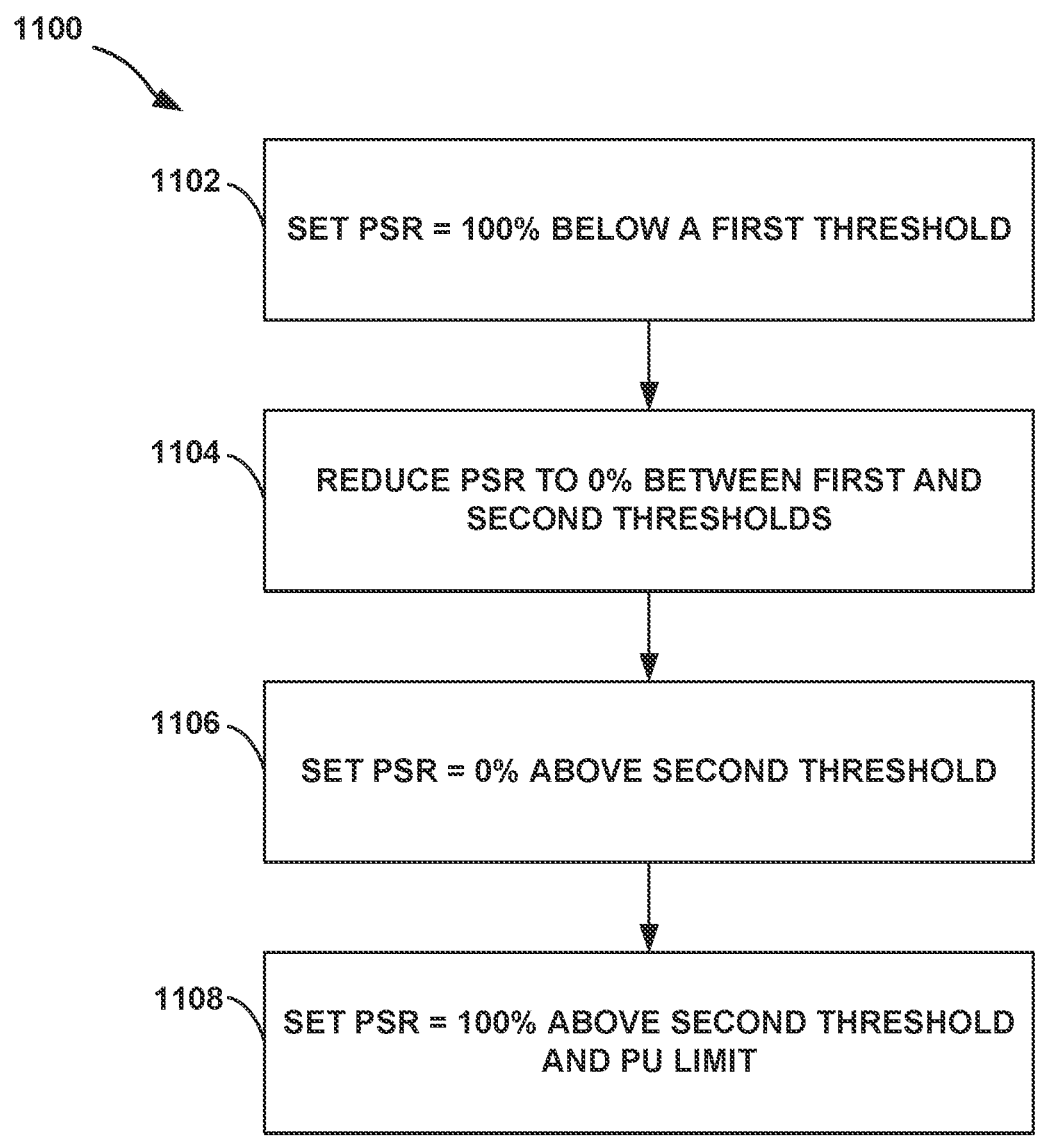
FIG. 11 is a flowchart of an example method of scheduled power management in a hybrid propulsion system, in accordance with one or more techniques of this disclosure.

FIGS. 10-11 illustrate an example scheduled power management method 1100 and are described concurrently with reference to each other below.

FIG. 10 is a plot illustrating an example plot 1000 illustrating example power output as a function of power demand curves 1002-1006 for a scheduled power share request, in accordance with one or more techniques of this disclosure. In the example shown, total power curve 1002 is the sum of power unit curve 1004 and ESS curve 1006 for a 70/30 power unit-to-ESS power ratio as described above with respect to FIG. 4. In the example shown, low power demand is all electric, e.g., sourced only from ESS 34. Mid-range power demand is increasingly sourced via power units 6, and high-power demands are sourced almost all via power units 6. For power demands higher than the output limits of the power units 6, the ESS provides the power boost. For critical power demands greater than the power units 6 providing power at their respective output limits and the ESS's providing power at their respective output capacities, the power unit output limits may be overridden to provide extra power, for example, for critical propulsion demands.

FIG. 11 is a flowchart of an example method 1100 of scheduled power management in a hybrid propulsion system, in accordance with one or more techniques of this disclosure. The example method 1100 may be performed, for example, by controller 36 executing the steps of the method. In some examples of scheduled power management method 1100, a power share request may directly specify ESS output as a function of power demand, with the power unit supplying the rest of the power demand. In other examples of scheduled power management method 1100, the method 1100 may determine a power share request based on a received power demand and a predetermined schedule and may output the determined power share request and power demand as input to sequential power management method 600 and/or continuous power management method 900. In some examples, a scheduled power management method may replace a user selecting a power share request value.

A power demand may be received or otherwise obtained (1102). As one example, a user may provide input via a throttle, switch, etc., which may be converted to a power demand by system state manager 302 and/or controller 36.

Whether the power demand is less than or equal to a first power demand threshold may be determined (1104). If the power demand is less than or equal to the first power demand threshold, the power share request may be set to 100% and ESS output may be increased, decreased and/or changed to meet the power demand. For example, controller 36 may cause ESS 34 to increase and/or decrease output to meet the power demand. In some examples, ESS output may displace power unit output, as described above with respect to FIG. 6.

In the example illustrated in FIG. 10, the scheduled power share request of 100% results in all of the power demand being sourced from the ESS for a power demand that is less than or equal to the first threshold T1. In the example shown, first threshold T1 is a power demand of 10% of the total available power. ESS curve 406 increases and/or decreases with a 1:1 correspondence to the power demand and power unit curve 404 remains at 0% for a power demand from 0% to less than or equal to 10%, e.g., the first threshold.

If the power demand is greater than the first power demand threshold at (1104), whether the power demand is less than or equal to a second power demand threshold may be determined (1106). If the power demand is less than or equal to the second power demand threshold, the power share request may be determined such that the ESS output reduces from its power output level at the first threshold to 0% at the second threshold.

In the example illustrated in FIG. 10, ESS curve 1006 decreases linearly from an ESS output level of 10% at a power demand of 10% to a ESS output level of 0% at a power demand of the second threshold T1, e.g., 50% in the example shown. The rest of the power demand is source from the power unit, which correspondingly increases and/or decreases linearly from 0% at a power demand of T1 to the sourcing all of the power demand at T2, e.g., 50% in the example shown. In some examples, the ESS output level may decrease at a rate other than linearly, e.g., exponentially, according to predetermined schedule, according to any other function, such as polynomial, and the like.

If the power demand is greater than the second power demand threshold at (1106), whether the power demand is less than or equal to the power unit output limit may be determined (1108). If the power demand is less than or equal to the power unit output limit, the power share request may be set to 0% resulting in all of the power demand being supplied by the power unit.

In the example illustrated in FIG. 10, ESS curve 1006 remains at 0% and power unit curve 1004 increases and/or decreases with a 1:1 correspondence to the power demand for a power demand greater than the second threshold T2 and less than or equal to the power unit output limit, e.g., 70% in the example shown per the 70/30 ratio of the example.

If the power demand is greater than the power unit output limit at (1108), whether the power demand is less than or equal to the sum of the power unit output limit and the ESS output capacity may be determined (1110). If the power demand is less than or equal to the sum of the power unit output limit and the ESS output capacity, the power share request may be set to 100% and/or the ESS output may be increased and/or decreased to meet the power demand.

In the example illustrated in FIG. 10, ESS curve 1006 increases and/or decreases with a 1:1 correspondence to the power demand and power unit curve 1004 remains at 70% for a power demand greater than the power unit output limit and less than or equal to the sum of the power unit output limit and the ESS output capacity, e.g., 100% of the total available power.

If the power demand is greater than the sum of the power unit output limit and the ESS output capacity at (1110), the power unit output may be increased and/or decreased to meet the power demand (1112), as described above with respect to FIGS. 6 and 9. For example, the power unit output limit may be overridden to meet a power demand, such as a propulsion power demand. In some examples, the total available output power illustrated in FIG. 10 is the total output power according to power unit and ESS limits and is less than the total possible power output. Total possible output power may be based on the peak power outputs of the power units and the output capacities of the ESS's.

Scheduled power management method 1100 may be used for increasing and/or decreasing power demands. For example, the power outputs of ESS 34 and power unit 6A illustrated in FIG. 10 may be valid for a power demand that is adjusted to increase and/or decrease. In other examples, the ESS curve 1006 and power unit curve 1004 of plot 1000 may follow different paths for decreasing power demands, e.g., plot 1000 may have hysteresis.

In other examples, power schedule management method 1100 may use fewer or more thresholds, and may determine a power share request, ESS output, and/or power unit output based on any of the power demand, one or more power demand thresholds, one or more ESS output capacities, one or more ESS output limits, one or more power unit output limits and peak outputs, ESS and/or power unit faults and/or fault conditions, environmental conditions, and the like.

In some examples, other power schedule methods may determine the sourcing distribution among one or more ESS's and one or more power units for any power demand in any manner. For example, power schedule management method may specify the amount of power to be sourced from each individual power unit 6 and ESS for any power demand.

Figure 12:
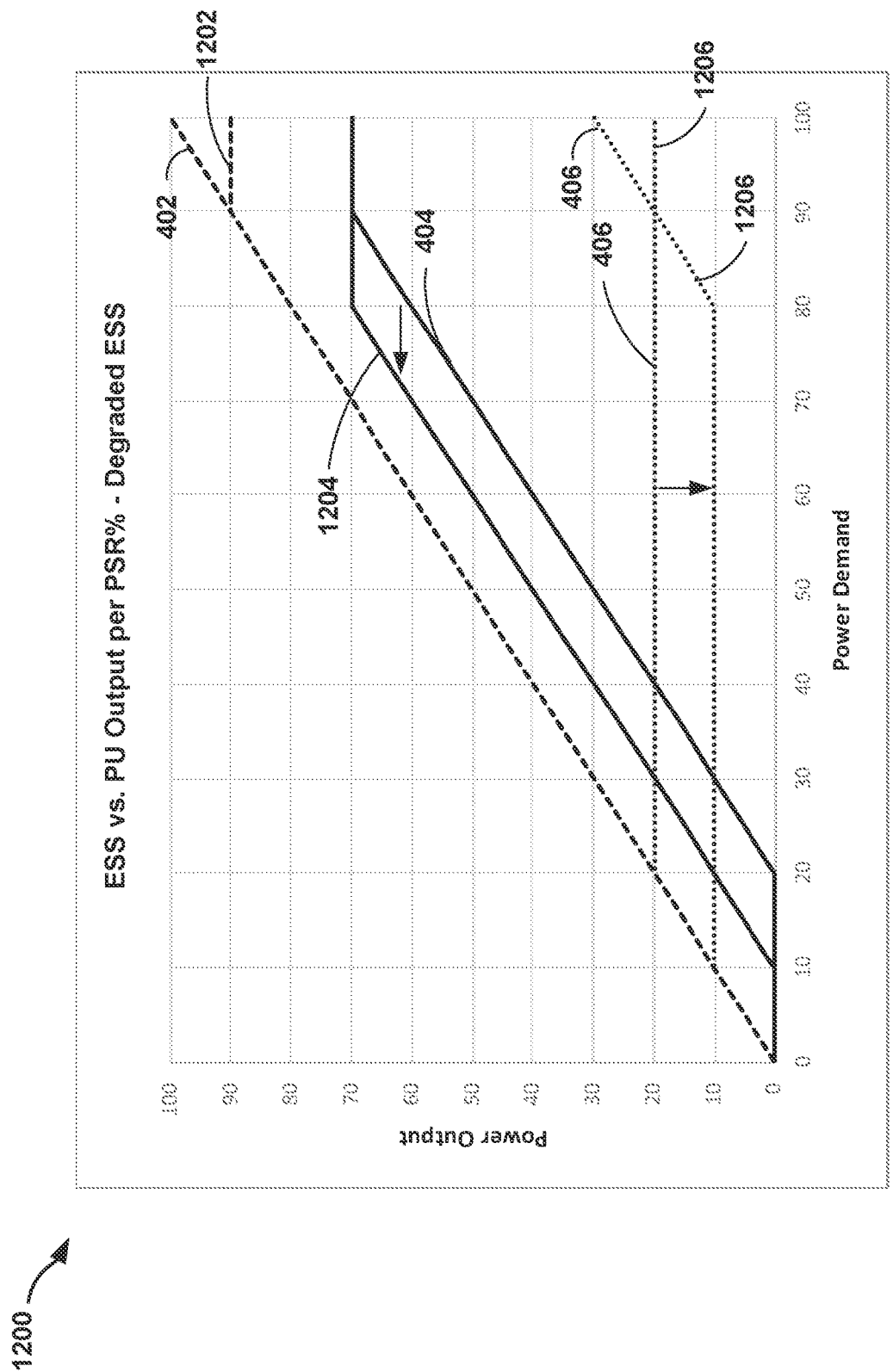
FIG. 12 is a plot illustrating an example degraded ESS power management method, in accordance with one or more techniques of this disclosure.

FIG. 12 is a plot illustrating example degraded power management curves, in accordance with one or more techniques of this disclosure. The example shown illustrates power demand curves 402-406 for a power share request of 67% of an example sequential power management method, such as method 600, in comparison with the equivalent power demand curves 1202-1206 for a power share request of 67% of the example sequential power management method for a degraded ESS. For example, ESS 34 may be almost out of charge and has been limited to only 67% of its full capability/capacity to prevent damaging excess discharge.

In the example shown, total power curve 1202 is the sum of power unit curve 1204 and ESS curve 1206. The example shown is illustrated for a 70/20 ratio, e.g., the output power of the ESS is degraded by 10% and the ESS is only able to reach 20% of the total output power rather than 30%, as described above with respect to FIG. 4. In the examples shown, the total power curve 1202 shows a maximum output of 90% for power demands greater than 90% as a consequence of the degraded ESS. In the example shown, the degraded ESS curve 1206 is shifted down 10% relative to ESS curve 406. As such, the power unit curve 1204 is shifted "left" relative to power unit curve 404, e.g., the power unit supplies output power for lower power demands, e.g., greater than 10%, in order to meet the power demand in conjunction with a degraded ESS. As described above, in some examples for power demands greater than 100%, or 90% in the current example, power unit 6A may override its output limits to provide output power up to its output power capacity.

Figure 13:
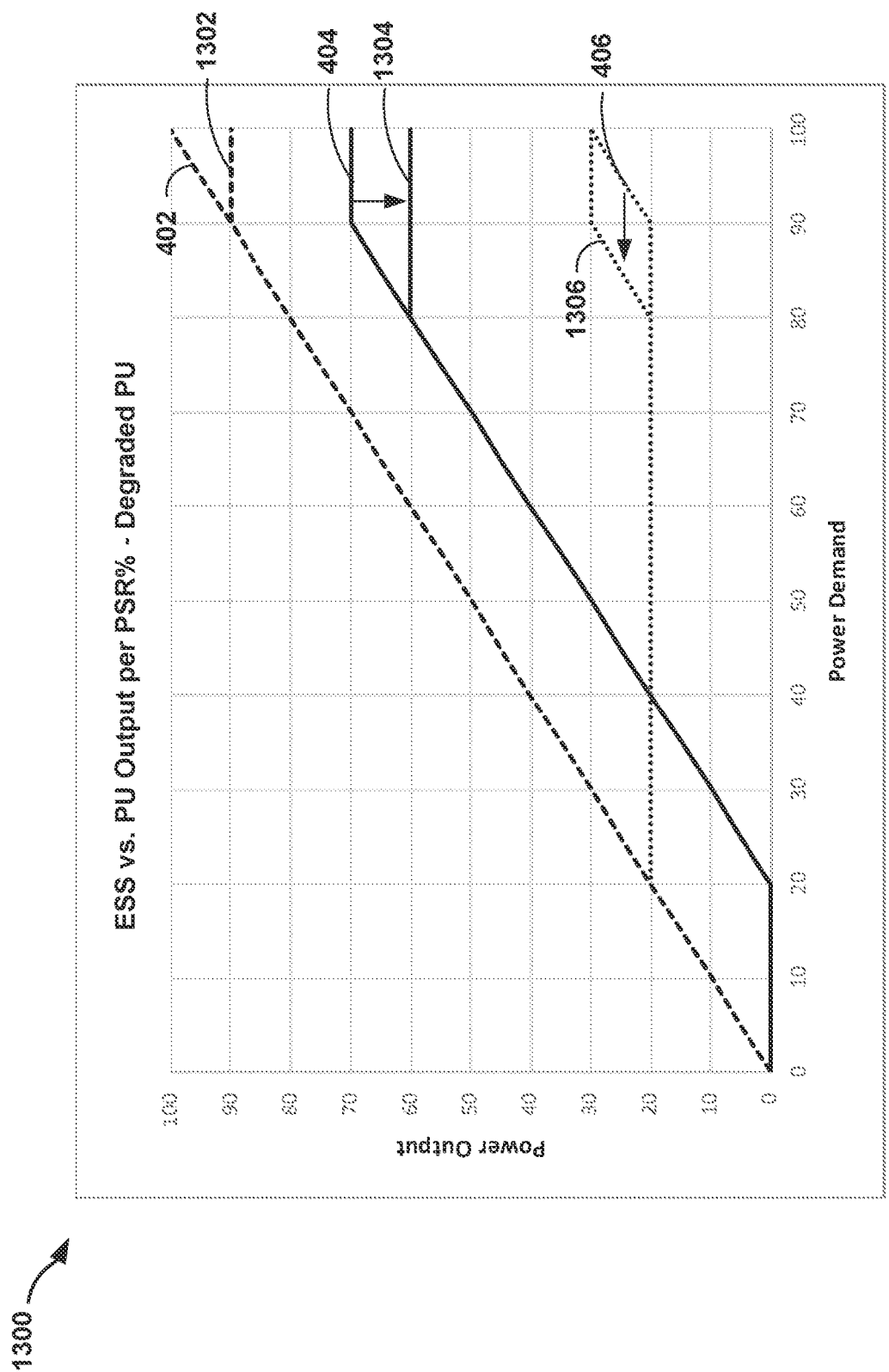
FIG. 13 is a plot illustrating an example degraded power unit power management method, in accordance with one or more techniques of this disclosure.

FIG. 13 is a plot illustrating example degraded power management curves, in accordance with one or more techniques of this disclosure. The example shown illustrates power demand curves 402-406 for a power share request of 67% of an example sequential power management method, such as method 600, in comparison with the equivalent power demand curves 1302-1306 for a power share request of 67% of the example sequential power management method for a degraded power unit. For example, power unit may be operating at an elevated temperature and may have less power available, e.g., the power unit may have only 86% of its full capability/capacity.

In the example shown, total power curve 1302 is the sum of power unit curve 1304 and ESS curve 1306. The example shown is illustrated for a 60/30 ratio, e.g., the output power of the power unit is degraded by 10% and the power unit is only able to reach 60% of the total output power rather than 70%, as described above with respect to FIG. 4. In the examples shown, the total power curve 1302 shows a maximum output of 90% for power demands greater than 90% as a consequence of the degraded power unit. In the example shown, the degraded power unit curve 1304 is shifted down 10% relative to power unit curve 404. As such, the ESS curve 1306 is shifted "left" relative to ESS curve 406, e.g., the ESS supplies output power for lower power demands beyond the output limit of the power unit, e.g., greater than 80%, in order to meet the power demand in conjunction with a degraded power unit. In some examples, the ESS may be the be required to change modes when the power unit is fully degraded/disabled, such as from current regulation to voltage regulation.

Figure 14:
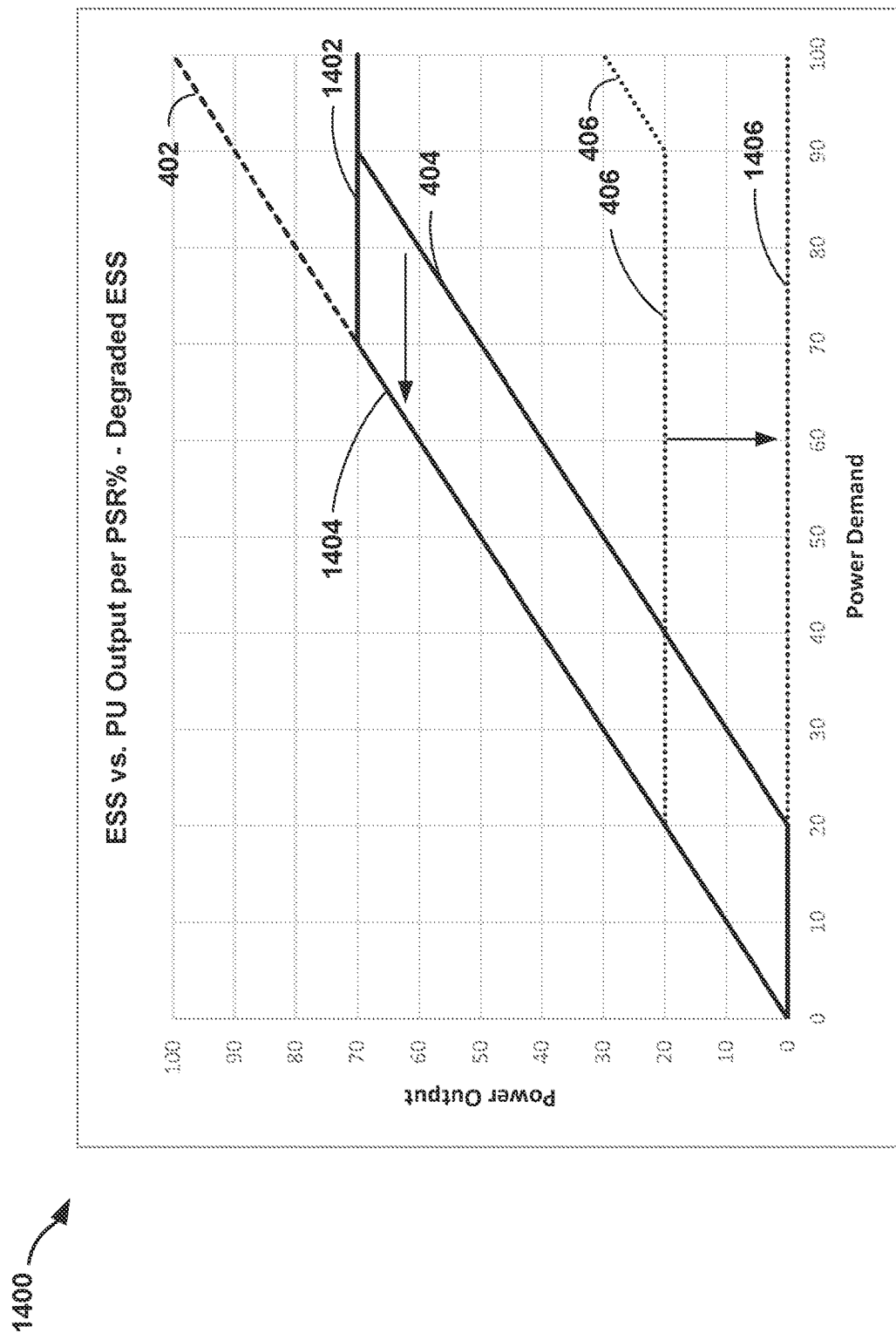
FIG. 14 is a plot illustrating an example disabled ESS power management method, in accordance with one or more techniques of this disclosure.

FIG. 14 is a plot illustrating example disabled power management curves, in accordance with one or more techniques of this disclosure. The example shown illustrates power demand curves 402-406 for a power share request of 67% of an example sequential power management method, such as method 600, in comparison with the equivalent power demand curves 1402-1406 for a power share request of 67% of the example sequential power management method for a disabled ESS. For example, ESS 34 may be non-functional, fully out of charge, and/or otherwise disabled.

In the example shown, total power curve 1402 is the sum of power unit curve 1404 and ESS curve 1406, e.g., which is at 0% output for any power demand because it is disabled. The example shown is illustrated for a 70/0 ratio, e.g., the output power of the ESS is disabled by 100% and the ESS is only able to reach 0% of the total output power rather than 30%, as described above with respect to FIG. 4. In the examples shown, the total power curve 1402 shows a maximum output of 70% for power demands greater than 70% as a consequence of the disabled ESS. In the example shown, the disabled ESS curve 1406 is shifted down to 0% output. As such, the power unit curve 1404 is shifted "left" relative to power unit curve 404, e.g., the power unit supplies output power for lower power demands, e.g., greater than 0%, in order to meet the power demand in conjunction with a disabled ESS. As described above, in some examples for power demands greater than 100%, or 70% in the current example, power unit 6A may override its output limits to provide output power up to its output power capacity.

Figure 15:
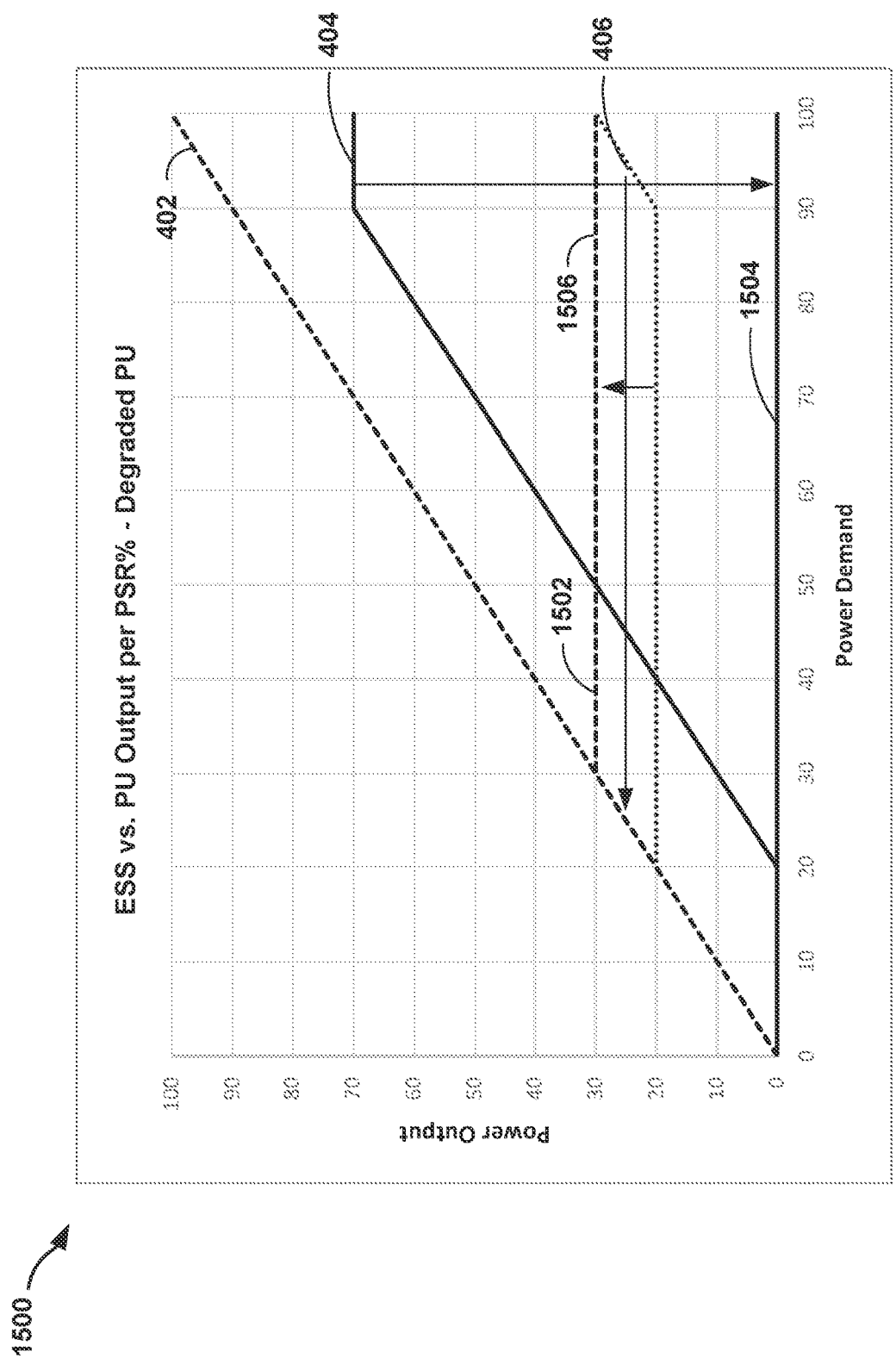
FIG. 15 is a plot illustrating an example disabled power unit power management method, in accordance with one or more techniques of this disclosure.

FIG. 15 is a plot illustrating example disabled power management curves, in accordance with one or more techniques of this disclosure. The example shown illustrates power demand curves 402-406 for a power share request of 67% of an example sequential power management method, such as method 600, in comparison with the equivalent power demand curves 1502-1506 for a power share request of 67% of the example sequential power management method for a disabled power unit which may not output any power.

In the example shown, total power curve 1502 is the sum of power unit curve 1504, e.g., which is at 0% output for any power demand because it is disabled, and ESS curve 1506. The example shown is illustrated for a 0/30 ratio, e.g., the output power of the power unit is disabled by 100% and the power unit is only able to reach 0% of the total output power rather than 70%, as described above with respect to FIG. 4. In the examples shown, the total power curve 1502 shows a maximum output of 30% for power demands greater than 30% as a consequence of the disabled power unit. In the example shown, the disabled power unit curve 1504 is shifted down to 0% output. As such, the ESS curve 1506 is shifted "left" relative to ESS curve 406, e.g., the ESS supplies output power for lower power demands in order to meet the power demand in conjunction with a disabled power unit. In some examples, the ESS may be the be required to change modes because the power unit is fully disabled, such as from current regulation to voltage regulation.

In some examples, controller 36 may determine that an ESS or a power unit, e.g., ESS 34 and/or power unit 6A, are degraded and/or disabled. For example, controller 36 may receive information from ESS 34 and/or power unit 6A such as feedback relating to electrical current and environmental conditions of ESS 34 and power unit 6A such as temperatures and pressures. Controller 36 may determine the amount of degradation of ESS 34 and power unit 6A. In some examples, controller 36 may determine a predetermined ESS output limit based on the power share request and the determined degradation of one or more ESS and power unit.

In some examples, both the ESS and the power unit may be degraded/disabled.

The following examples may illustrate one or more aspects of the disclosure:

Example 1. A method of managing power in a hybrid propulsion system, the method comprising: receiving, by one or more processors, a power demand that specifies an amount of power to be used to propel a vehicle that includes an electrical energy storage system (ESS) and one or more electrical generators, wherein the one or more electrical generators are configured to convert mechanical energy to electrical energy; determining, based on the power demand and a predetermined ESS output limit, a first amount of power to be sourced from the ESS and a second amount of power to be sourced from the one or more generators; and causing, by the one or more processors, the ESS to output the first amount of power onto a direct current (DC) electrical distribution bus and the one or more generators to output the second amount of power onto the DC electrical distribution bus.

Example 2. The method of example 1, wherein determining the first amount of power and the second amount of power comprises determining that the second amount of power is zero in response to determining that the amount of power specified by the power demand is less than or equal to the predetermined ESS output limit.

Example 3. The method of any one of examples 1-2, wherein determining the first amount of power and the second amount of power comprises determining that the first amount of power is the predetermined ESS output limit in response to determining that the amount of power specified by the power demand is greater than the predetermined ESS output limit and is less than or equal to a predetermined output limit of the one or more electrical generators.

Example 4. The method of any one of examples 1-3, wherein determining the first amount of power and the second amount of power comprises determining that the first amount of power is greater than the predetermined ESS output limit in response to determining that the amount of power specified by the power demand is greater than the predetermined output limit of the one or more electrical generators.

Example 5. The method of any one of examples 1-4, wherein determining the first amount of power and the second amount of power comprises determining that the first amount of power is a maximum available ESS output capability and that the second amount of power is greater than the predetermined output limit of the one or more electrical generators in response to determining that the amount of power specified by power demand is greater than the sum of the predetermined ESS output limit and the predetermined output limit of the one or more electrical generators.

Example 6. The method of any one of examples 1-5, wherein determining the first amount of power and the second amount of power comprises determining that the first amount of power is a pre-determined portion of the amount of power to be used to propel the vehicle and that the second amount of power is the difference between the amount of power to be used to propel the vehicle and the first amount of power for a power demand that is less than the predetermined ESS output limit.

Example 7. The method of any one of examples 1-6, further comprising determining the predetermined ESS output limit based on at least one of a user input and a control algorithm.

Example 8. The method of example 7, wherein the control algorithm comprises at least one of a power schedule and a mission plan.

Example 9. The method of example 8, wherein determining the predetermined ESS output limit based on the power schedule comprises one or more of: setting the predetermined ESS output limit to the ESS output capability for a power demand less than a first threshold; setting the predetermined ESS output limit between the ESS output capability and zero inversely proportional to the power demand for a power demand between the first threshold and a second threshold greater than the first threshold; setting the predetermined ESS output limit to zero for a power demand greater than the second threshold; and setting the predetermined ESS output limit to the ESS output capability for a power demand greater than both the second threshold and an output capability of the one or more generators.

Example 10. The method of any one of examples 1-9, further comprising determining the predetermined ESS output limit based on at least one of an ESS fault condition, an environmental condition, a change of an ESS output capability, and a total vehicle power available.

Example 11. The method of any one of example 1-10, further comprising determining the predetermined ESS output limit based on at least one of a degraded ESS and a degraded electrical generator.

Example 12. The method of any one of examples 1-11, wherein the one or more electrical generators regulate a voltage of the DC electrical distribution bus.

Example 13. A system comprising: an electrical energy storage system (ESS) configured to output electrical power onto a direct current (DC) electrical distribution bus; one or more electrical generators configured to output electrical power onto the DC electrical distribution bus, wherein the one or more electrical generators are configured to convert mechanical energy into electrical energy; one or more electrical propulsion units configured to propel a vehicle using electrical power received via the DC electrical distribution bus; and one or more processors configured to: receive a power demand that specifies an amount of power to be used to propel the vehicle; determine, based on the power demand and a predetermined ESS output limit, a first amount of power to be sourced from the ESS and a second amount of power to be sourced from the one or more generators; and cause the ESS to output the first amount of power onto the DC electrical distribution bus and cause the one or more electrical generators to output the second amount of power onto the DC electrical distribution bus.

Example 14. The system of example 13, wherein the one or more processors are further configured to determine that the second amount of power is zero based on a determination that the power demand is less than or equal to the predetermined ESS output limit.

Example 15. The system of any one of examples 13-14, wherein the one or more processors are further configured to determine that the first amount of power is predetermined ESS output limit based on a determination that the power demand is greater than the predetermined ESS output limit and is less than or equal to a predetermined output limit of the one or more electrical generators.

Example 16. The system of any one of examples 13-15, wherein the one or more processors are further configured to determine that the first amount of power is greater than the predetermined ESS output limit based on a determination that the power demand is greater than the predetermined output limit of the one or more electrical generators.

Example 17. The system of any one of examples 13-16, wherein the one or more processors are further configured to determine the predetermined ESS output limit based on at least one of an ESS fault condition, an environmental condition, a change of an ESS output capability, and a total vehicle power available.

Example 18. The system of any one of examples 13-17, wherein the one or more processors are further configured to determine the predetermined ESS output limit based on at least one of a degraded ESS and a degraded electrical generator.

Example 19. The system of any one of examples 13-18, wherein the one or more processors are further configured to determine the predetermined ESS output limit based on at least one of a user input and a control algorithm.

Example 120. The system of any one of examples 13-19, wherein the control algorithm comprises at least one of a power schedule and a mission plan.

Various examples have been described. These and other examples are within the scope of the following claims.

What is claimed is:

1. A method of managing power in a hybrid propulsion system, the method comprising:
  receiving, by one or more processors, a power demand that specifies an amount of power to be used to propel a vehicle that includes an electrical energy storage system (ESS) and one or more electrical generators, wherein the ESS is configured to output electrical power onto a direct current (DC) electrical distribution bus, wherein the one or more electrical generators are configured to convert mechanical energy to electrical energy and to output electrical power onto the DC electrical distribution bus, wherein one or more electrical propulsion units are configured to propel the vehicle using electrical power received via the DC electrical distribution bus;
  receiving, by the one or more processors via a user input device, a power share request from a user, wherein the power share request corresponds to a percentage of the power demand;
  determining, by the one or more processors and based on the power share request, a predetermined ESS output limit;
  determining, by the one or more processors and based on the power demand and the predetermined ESS output limit, a first amount of power to be sourced from the ESS and a second amount of power to be sourced from the one or more generators, wherein the predetermined ESS output limit is a portion of an ESS output capacity that is less than the full ESS output capacity;
  in response to determining that the amount of power specified by the power demand is less than or equal to the predetermined ESS output limit, determining, by the one or more processors, that the second amount of power is zero;
  in response to determining that the amount of power specified by the power demand is greater than the predetermined ESS output limit and is less than or equal to a predetermined output limit of the one or more electrical generators, determining, by the one or more processors, that the first amount of power is the predetermined ESS output limit; and
  causing, by the one or more processors, the ESS to output the first amount of power onto the DC electrical distribution bus and the one or more generators to output the second amount of power onto the DC electrical distribution bus.

2. The method of claim 1, wherein determining the first amount of power and the second amount of power comprises determining, by the one or more processors, that the first amount of power is greater than the predetermined ESS output limit in response to determining that the amount of power specified by the power demand is greater than the predetermined output limit of the one or more electrical generators.

3. The method of claim 1, wherein determining the first amount of power and the second amount of power comprises determining, by the one or more processors, that the first amount of power is a maximum available ESS output capability and that the second amount of power is greater than the predetermined output limit of the one or more electrical generators in response to determining that the amount of power specified by the power demand is greater than a sum of the predetermined ESS output limit and the predetermined output limit of the one or more electrical generators.

4. The method of claim 1, further comprising determining, by the one or more processors, the predetermined ESS output limit based on at least one of an ESS fault condition, an environmental condition, a change of an ESS output capability, and a total vehicle power available.

5. The method of claim 1, further comprising determining, by the one or more processors, the predetermined ESS output limit based on at least one of a degraded ESS and a degraded electrical generator.

6. The method of claim 1, wherein the one or more electrical generators regulate a voltage of the DC electrical distribution bus.

7. A system comprising:
an electrical energy storage system (ESS) configured to output electrical power onto a direct current (DC) electrical distribution bus;
one or more electrical generators configured to output electrical power onto the DC electrical distribution bus, wherein the one or more electrical generators are configured to convert mechanical energy into electrical energy;
a user input device configured to receive a power share request from a user;
one or more electrical propulsion units configured to propel a vehicle using electrical power received via the DC electrical distribution bus; and
one or more processors configured to:
receive a power demand that specifies an amount of power to be used to propel the vehicle;
receive, via the user input device, the power share request, wherein the power share request corresponds to a percentage of the power demand;
determine, based on the power share request, a predetermined ESS output limit;
determine, based on the power demand and the predetermined ESS output limit, a first amount of power to be sourced from the ESS and a second amount of power to be sourced from the one or more generators, wherein the predetermined ESS output limit is a portion of an ESS output capacity that is less than the full ESS output capacity;
determine that the second amount of power is zero based on a determination that the power demand is less than or equal to the predetermined ESS output limit;
determine that the first amount of power is the predetermined ESS output limit based on a determination that the power demand is greater than the predetermined ESS output limit and is less than or equal to a predetermined output limit of the one or more electrical generators; and
cause the ESS to output the first amount of power onto the DC electrical distribution bus and cause the one or more electrical generators to output the second amount of power onto the DC electrical distribution bus.

8. The system of claim 7, wherein the one or more processors are further configured to determine that the first amount of power is greater than the predetermined ESS output limit based on a determination that the power demand is greater than the predetermined output limit of the one or more electrical generators.

9. The system of claim 7, wherein the one or more processors are further configured to determine the predetermined ESS output limit based on at least one of an ESS fault condition, an environmental condition, a change of an ESS output capability, and a total vehicle power available.

10. The system of claim 7, wherein the one or more processors are further configured to determine the predetermined ESS output limit based on at least one of a degraded ESS and a degraded electrical generator.

11. The system of claim 7, wherein the one or more processors are further configured to determine the predetermined ESS output limit based on at least one of a user input and a control algorithm.

12. The system of claim 11, wherein the control algorithm comprises at least one of a power schedule and a mission plan.

13. The system of claim 7, wherein a generator of the one or more electrical generators is configured to regulate a voltage of the DC electrical distribution bus.

14. The system of claim 13, wherein the one or more processors configured to:
determine, based on the power demand being less than or equal to the predetermined ESS output limit, a voltage sourced from the ESS that displaces at least a portion of a voltage sourced from the one or more generators to regulate the voltage of the DC electrical distribution bus.

15. The system of claim 7, wherein the ESS is configured to regulate a voltage of the DC electrical distribution bus.

16. The system of claim 15, wherein the one or more processors configured to:
determine, based on the power demand being greater than the predetermined ESS output limit, a portion of the second amount of power to be sourced from the one or more generators that displaces at least a portion of the first amount of power to be sourced from the ESS.

* * * * *